US012792803B2

(12) United States Patent
Saha et al.

(10) Patent No.: US 12,792,803 B2
(45) Date of Patent: Nov. 10, 2026

(54) METHODS AND APPARATUS TO PREDICT OUTPUTS OF ELECTRONIC DESIGN AUTOMATION TOOLS USING MACHINE LEARNING

(71) Applicant: Intel Corporation, Santa Clara, CA (US)

(72) Inventors: Sourav Saha, Bangalore (IN); Rakshit Bazaz, Bangalore (IN); Anmol Khatri, Bangalore (IN); Raj Chetan Yadav, Vadodara (IN)

(73) Assignee: Intel Foundry IP LLC, Santa Clara, CA (US)

( * ) Notice: Subject to any disclaimer, the term of this patent is extended or adjusted under 35 U.S.C. 154(b) by 617 days.

(21) Appl. No.: 18/182,004

(22) Filed: Mar. 10, 2023

(65) Prior Publication Data

US 2024/0303401 A1 Sep. 12, 2024

(51) Int. Cl.

| | |
|---|---|
| ***G06F 30/31*** | (2020.01) |
| ***G06F 30/27*** | (2020.01) |
| ***G06F 30/327*** | (2020.01) |
| ***G06F 30/33*** | (2020.01) |
| ***G06F 30/367*** | (2020.01) |
| ***G06F 30/392*** | (2020.01) |
| ***G06F 30/398*** | (2020.01) |
| *G06F 119/12* | (2020.01) |

(52) U.S. Cl.

CPC .............. *G06F 30/31* (2020.01); *G06F 30/27* (2020.01); *G06F 30/327* (2020.01); *G06F 30/392* (2020.01); *G06F 30/33* (2020.01); *G06F 30/367* (2020.01); *G06F 30/398* (2020.01); *G06F 2119/12* (2020.01)

(58) Field of Classification Search

CPC ........ G06F 30/27; G06F 30/31; G06F 30/327; G06F 30/33; G06F 30/367; G06F 30/392; G06F 30/398; G06F 2119/12

USPC .... 716/102, 106, 111, 131, 136; 703/16, 17, 703/19

See application file for complete search history.

(56) References Cited

U.S. PATENT DOCUMENTS

| | | | | |
|---|---|---|---|---|
| 11,675,960 B2 * | 6/2023 | Apte | G06F 30/392 716/112 |
| 11,829,852 B1 * | 11/2023 | Bhushan | G06F 30/33 |
| 11,836,435 B1 * | 12/2023 | Kang | G06F 30/394 |
| 12,124,782 B1 * | 10/2024 | Nath | G06N 5/01 |
| 12,393,755 B2 * | 8/2025 | Padmanabhan | G06N 3/084 |

(Continued)

FOREIGN PATENT DOCUMENTS

| | | | |
|---|---|---|---|
| CN | 113901753 A * | 1/2022 | G06F 30/394 |

*Primary Examiner* — Phallaka Kik

(74) *Attorney, Agent, or Firm* — Hanley, Flight & Zimmerman, LLC

(57) ABSTRACT

Methods, apparatus, systems, and articles of manufacture to predict outputs of electronic design automation (EDA) tools using machine learning are disclosed. An example apparatus includes memory; machine readable instructions; and programmable circuitry to at least one of instantiate or execute the machine readable instructions to: access circuit design data to be optimized by an EDA tool as part of a circuit design process for an integrated circuit; extract features from the circuit design data; apply a machine learning model to the features to estimate an output of the EDA tool, the estimated output determined without execution of the EDA tool; and provide results of the estimated output.

20 Claims, 12 Drawing Sheets

(56) References Cited

U.S. PATENT DOCUMENTS

| | | | | |
|---|---|---|---|---|
| 12,417,329 | B2 * | 9/2025 | Bunandar | G06N 3/084 |
| 2019/0057174 | A1 * | 2/2019 | Hashimoto | G06F 30/343 |
| 2020/0201727 | A1 * | 6/2020 | Nie | G06N 20/00 |
| 2021/0073456 | A1 * | 3/2021 | Nath | G06N 20/20 |
| 2021/0157312 | A1 * | 5/2021 | Cella | G06Q 30/06 |
| 2021/0249135 | A1 * | 8/2021 | Rimestad | G06T 7/33 |
| 2021/0334593 | A1 * | 10/2021 | Vo | G06N 7/01 |
| 2022/0108262 | A1 * | 4/2022 | Cella | G05B 17/02 |
| 2022/0121994 | A1 * | 4/2022 | Sun | G06N 20/00 |
| 2022/0171947 | A1 * | 6/2022 | Xu | G06F 40/35 |
| 2023/0106667 | A1 * | 4/2023 | Hane | G06N 20/20<br>706/12 |
| 2023/0107556 | A1 * | 4/2023 | Tao | G03F 1/36<br>716/53 |
| 2023/0144285 | A1 * | 5/2023 | Timmireddy | G06F 30/327<br>716/102 |
| 2023/0280810 | A1 * | 9/2023 | Lu | G06F 1/28<br>713/300 |
| 2023/0289633 | A1 * | 9/2023 | Levy | G06F 18/2148 |
| 2023/0342654 | A1 * | 10/2023 | Shukla | G06N 20/00 |
| 2024/0078368 | A1 * | 3/2024 | C | G06F 30/3312 |
| 2024/0111894 | A1 * | 4/2024 | Kreis | G06N 3/084 |
| 2024/0169040 | A1 * | 5/2024 | Rao | G06F 21/316 |
| 2024/0169218 | A1 * | 5/2024 | Lee | G06Q 30/0203 |
| 2025/0005239 | A1 * | 1/2025 | Sofue | G06F 30/27 |
| 2025/0013221 | A1 * | 1/2025 | Coffman | G06N 20/00 |
| 2025/0209245 | A1 * | 6/2025 | Blanton | G06N 5/01 |
| 2026/0017458 | A1 * | 1/2026 | Galvin | G06F 16/3325 |
| 2026/0037802 | A1 * | 2/2026 | Kennel | G06F 16/9024 |
| 2026/0161563 | A1 * | 6/2026 | Rumanek | G06F 12/0811 |

* cited by examiner

METHODS AND APPARATUS TO PREDICT OUTPUTS OF ELECTRONIC DESIGN AUTOMATION TOOLS USING MACHINE LEARNING

FIELD OF THE DISCLOSURE

This disclosure relates generally to circuit design and, more particularly, to methods and apparatus to predict outputs of electronic design automation tools using machine learning.

BACKGROUND

Circuit design (e.g., integrated circuit design, system-on-chip (SOC) design, printed circuit board design, etc.) often involves the use of computer aided design (CAD) software packages commonly referred to as electronic design automation (EDA) tools. EDA tools help design both the logical or functional aspects of a circuit as well as the physical layout of components to achieve the logical or functional aspects within specified constraints (e.g., timing requirements, circuit efficiency, power consumption, etc.).

BRIEF DESCRIPTION OF THE DRAWINGS

In general, the same reference numbers will be used throughout the drawing(s) and accompanying written description to refer to the same or like parts. The figures are not necessarily to scale.

Figure 1:
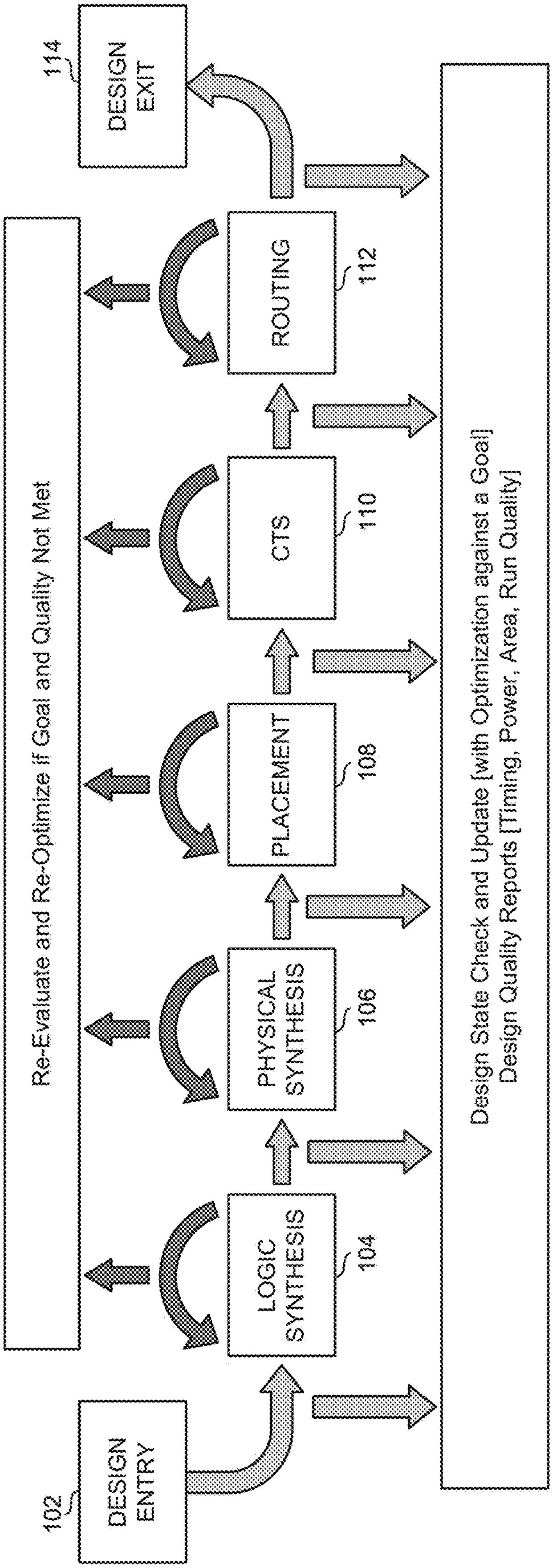
FIG. 1 is a block diagram representing different stages in the construction phase of circuit design process.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs), one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

System-on-chip (SOC) design can be divided into two relatively high level phases including the structural design construction phase (also known as the automated place and route (APR) phase) and the sign-off phase. During the construction phase, circuit design engineers use EDA tools to create a theoretical layout of components that meets (e.g., is optimized for) various design specifications (e.g., timing requirements, power consumption requirements, size requirements, etc.). During the sign-off phase, the theoretical layout generated during the construction phase undergoes various tests and/or analyses to ensure the SOC will meet all desired aspects of design quality before being approved for manufacturing.

Both the construction phase and the sign-off phase may be further subdivided into multiple stages. For instance, the construction phase is often divided into separate stages including a logic synthesis stage, a physical synthesis stage, a placement stage, a clock tree synthesis (CTS) stage, and a routing stage. In some instances, two or more of these stages may be combined. In some instances, the stages can be divided into additional stages and/or divided in different ways.

The logic synthesis stage of the construction phase of circuit design translates or transforms an initial description of a circuit design (e.g., a register-transfer level (RTL) description provided by a circuit design engineer) into a more detailed gate-level description (e.g., netlist description) of the circuit that defines individual components or standard cells to be used to create the entire circuit design along with a description of how the inputs and outputs of each standard cell are connected (e.g., the logical connections between the standard cells) with associated timing constraints. As used herein, a standard cell is a group of one or more transistors and interconnect structures that provide a Boolean logic function (e.g., AND, OR, XOR, XNOR, inverter, etc.) or a storage function (e.g., flipflop, latch, etc.).

The physical synthesis stage of the construction phase of circuit design takes the output of the logic synthesis stage and determines physical properties (e.g., size, materials used, etc.) for the components (e.g., transistors) of the standard cells that can modify certain attributes (e.g., drive strength, capacitive load, threshold voltage, etc.) of the standard cells to help meet the requirements for the intended functionality of the standard cells and the overall functionality of the circuit (based on constraints on performance, power consumption, space, etc.). In some cases, the logic synthesis stage and the physical synthesis stage are combined into an overarching synthesis stage.

The placement stage of the construction phase of circuit design serves to determine the placement or relative position of the various standard cells defined at the logic synthesis stage given the physical properties for such cells defined by the physical synthesis stage and given by the size and/or other physical layout constraints of the overall circuit. In some instances, the placement stage includes performing an analysis to ensure that logic gates do not interfere with each other, and in some examples, may flag erroneous and/or incorrect location placement of standard cells.

The CTS stage of the construction phase of circuit design creates and/or synthesizes a clock network (e.g., creating a timing schedule for the circuit and/or subsystems and/or partitions thereof). In some examples, an ideal clock network is designed to assume that the clock reaches all standard cells at the same time, without accounting for cell delays. Creating the clock network allows the circuit to execute computer functions, such as functions defined in the standard cells, on a defined schedule to ensure the circuit design meets the timing requirements.

In the routing stage of the construction phase of circuit design, the physical metal interconnects or layout to be constructed in the circuit to interconnect the various input and outputs of each standard cell as well as interconnect different transistors or other components associated with a given standard cell are defined. Further, some standard cells are sequential cells (e.g., flops or latches) that need clock connections that are also determined during the routing stage. In some examples, the routing stage also performs additional analysis to enhance (e.g., optimize) the routing connections between different components to increase (e.g., maximize) the extent to which performance, power, and area constraints are satisfied. In some instances, this final optimization process is implemented in a separate post-routing stage subsequent to the routing stage.

The separate stages within the construction phase outlined above are implemented sequentially with the end result or output of each stage being used as an input for the next stage in the process. Each stage in the construction phase is a complex problem that involves the computationally intensive optimization in the design of many different components (that can number in the millions or more) that are structured and integrated in a manner that satisfies many different design constraints. As used herein, optimization is not limited to the best possible solution for a design of a given circuit, but includes any solution that meets (to within some threshold) all design specifications and quality checks for the given circuit. Thus, it is possible to optimize the design of a given circuit in multiple ways without any one solution (e.g., any one optimization) necessarily being better than another. However, some design optimizations might be better in some respects than another. Accordingly, it is not uncommon for the different stages of the construction phase to be repeated multiple times in an iterative manner before converging on a final optimization that is used going forward (e.g., when advancing to the next stage in the design process). More particularly, while some iterations through an EDA tool may be to optimize aspects of a circuit design for an entire chip or particular partition thereof, other iterations are not a full optimization but focus on optimizing one or more particular parameters before the final, full optimization is performed (e.g., in a subsequent iteration). Furthermore, due to the complex nature of circuit design, not all runs through a particular stage using an EDA tool will converge to a solution. In such situations, a circuit engineer provides changes to the input design state data provided to the EDA tool before rerunning the tool to see if the changes will enable the tool to converge to an optimized solution. Thus, circuit design is an iterative process that can involve an EDA tool being executed multiple times (e.g., 5 times, 10 times, 15 times, 20 times, 30 times, etc.) for any given stage in the construction process.

The iterative process for the construction phase of circuit design is diagrammatically represented in FIG. 1. As shown in the illustrated example, an engineer begins with an initial design entry 102 that serves as an input to a logic synthesis stage 104 implemented by an EDA tool. In some examples, the design entry 102 is based on and/or corresponds to a register-transfer level (RTL) description of the design. After completion of one iteration of the logic synthesis stage 104, the output design state data is checked against target optimization goals or thresholds for the output and associated quality metrics associated with design specification requirements. If the target optimization goals or thresholds and/or the quality metrics are not satisfied the logic synthesis stage 104 of the process is repeated. In some examples, subsequent iterations are based on changes to the initial RTL description for the circuit design. In some cases, changes to the RTL description are based on what was learned from one or more iterations (e.g., the most recent iteration) through the logic synthesis stage 104. In other cases, changes may be made independent of the output of the previous iteration(s) of the logic synthesis stage 104. For instance, in some examples, a circuit engineer may begin with multiple slightly different RTL descriptions of a desired circuit design with each being tested by being processed or run through the logic synthesis stage 104. Once all the target optimization goals or thresholds and the quality metrics are satisfied (e.g., the output of the logic synthesis is fully optimized), the process advances to the next stage.

In the illustrated example of FIG. 1, a physical synthesis stage 106 is the next stage. Thus, in this example, the final output of the logic synthesis stage 104 is used as an input to the physical synthesis stage 106. The physical synthesis stage 106 is repeated as many times as needed until associated optimization goals and quality metrics are satisfied before advancing to a placement stage 108. Likewise, a placement stage 108 is repeated as many times as needed until associated optimization goals and quality metrics are satisfied before advancing to a CTS stage 110, which is then iterated through as many times as needed before advancing to a routing stage 112 that is iterated until optimization is achieved to produce a final output 114 for the construction phase. In some examples, a separate EDA tool is used to implement each stage 104, 106, 108, 110, 112 in the circuit design process. In some examples, a single EDA tool is a software package suite with functionality to perform or implement two or more (e.g., all) of the stages 104, 106, 108, 110, 112 in the construction phase of the circuit design process.

In some examples, the final output 114 of the process shown in FIG. 1 is used as an input for the sign-off phase of circuit design, which can include multiple stages that need to be separately iterated through in a manner similar to the construction phase detailed above. Example stages or processes associated with the sign-off phase include layout verification, design rule checking (DRC), electrical topology checking, etc.

As noted above, the execution of an EDA tool in connection with any stage in the construction phase and/or any stage in the sign-off phase of circuit design is a computationally intensive process that involves the design, placement, routing and/or analysis of thousand, if not millions (or more), of circuit components. As a result, even a single iteration through a single stage in the construction phase cannot practically be performed in the human mind and often take a computer system several hours and up to several days (or more) depending on the size and complexity of the circuit being designed as well as the nature and/or capacity of the computer system that is executing the EDA tool. Having to repeat each stage multiple times means that each stage can take considerable amounts of time that can span across multiple days or weeks. Needing to iterate through each stage for this amount of time results in the overall time to complete the design of a circuit extending for many weeks if not months.

In some instances, as noted above, particular iterations through one or more stages in the construction process may be implemented for testing or experimental purposes. That is, an engineer modifies certain design parameters to test and see how the changes will affect the resulting output of the EDA tool at a given stage in the process to use that information in further modifying a circuit design. Currently, there is no easy way to obtain this information without running the design through an EDA tool, which can take hours, if not days, as explained above. Furthermore, as noted above, not every iteration through a given stage will converge to an optimized solution (e.g., converges to a solution that satisfied design specifications and quality checks) because the design constraints may be such that no solution is possible. However, as above, there is no easy way for engineers to know when particular design parameters will prevent convergence to a solution without running the design through an EDA tool. Having to wait hours, or even days, to learn the design is unworkable and/or to merely gain feedback about some aspect of interest being tested is inefficient and costly.

Examples disclosed herein employ machine learning models to predict the outputs of an EDA tool without executing the EDA tool based on the inputs to be provided to the EDA tool. Unlike EDA tools, which take many hours or more to run through a design stage to arrive at an optimized output, a machine learning model can output results relatively quickly (e.g., within a matter of minutes or less). As a result, a design engineer can get feedback on the sort of outputs to be expected from an EDA tool without having to wait for hours (or days) for the EDA tool to generate a full solution to a particular circuit design. While the output of the machine learning model does not necessarily replace the output of the EDA tool following a full analysis, the output of the machine learning model can help an engineer decide whether it would be worth implementing a particular test or experimental run on an EDA tool based on certain design parameters predicted by the machine learning model. For instance, if the machine learning model predicts that the EDA tool will not be able to converge to a solution and/or that the solution will not meet certain design constraints, the design engineer can make further changes or test different design parameters without wasting time on running the EDA tool only to learn it is unworkable. As a result, the machine learning models disclosed herein can save significant amounts of time and cost in the circuit design process. Furthermore, by avoiding the need to implement the EDA tool for a given design test, the efficiency of the computer system used to execute the EDA tool is improved by freeing up the computational capacity to enable the EDA tool to be executed to analyze other circuit designs.

Figure 2:
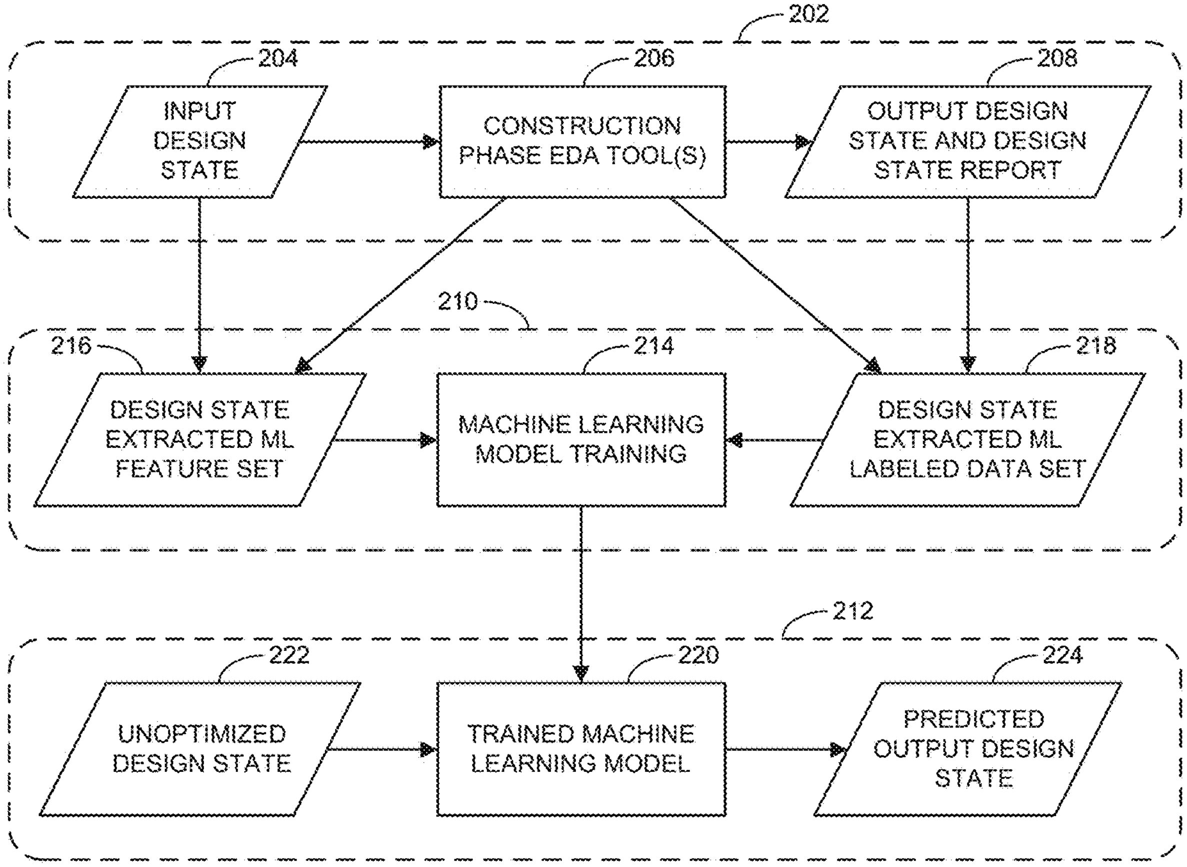
FIG. 2 is a block diagram illustrating the use of machine learning in conjunction with the construction phase of circuit design shown in FIG. 1.

FIG. 2 is a block diagram illustrating the use of machine learning in conjunction with the construction phase of the circuit design process as detailed above in connection with FIG. 1. Although described with respect to the construction phase, teachings disclosed herein can be suitable adapted for use in conjunction with the sign-off phase of the circuit design process. In the illustrated example of FIG. 2, the upper box 202 represents the typical or conventional process flow for circuit design. That is, the upper box 202 in FIG. 2 generally follows the process flow detailed above in connection with FIG. 1. The process begins with input design state data 204 (e.g., an RTL description of a circuit) that is analyzed by one or more EDA tool(s) 206 through a construction phase of the circuit design process that produces output design state data 208. As detailed in FIG. 1, the EDA tool(s) 206 may involve multiple stages of execution, each of which may be implemented multiple times before reaching a final optimization to then advance to the next stage. Everything below the upper box 202 in FIG. 2 represents the implementation of machine learning in accordance with teachings disclosed herein.

At a high level, artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the illustrated example of FIG. 2, the middle box 210 represents the learning/training phase and the bottom box 212 represents the inference phase. In the learning/training phase, a training algorithm is used to train a model (represented by block 214 in FIG. 2) to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

The model training 214 represented in FIG. 2 is supervised training based on input feature set data 216 used as the training inputs and labeled output data 218 as the expected or target outputs. More particularly, in some examples, the input feature set data 216 is based on and/or corresponds to the input design state data 204 and the labeled output data 218 is based on and/or corresponds to the output design state data 208. Thus, in some examples, the input feature set is based on an RTL description of circuit. However, in some examples, an RTL description provides is too high a level of abstraction of the circuit such that some pre-processing may involve a rudimentary synthesis (e.g., synthesis without optimization) to generate a gate-level description (e.g., a netlist description) of the circuit from which more particular information can be extracted to generate the input feature set.

In some examples, the input feature set data 216 is additionally or alternatively based on intermediate (partially optimized) data generated during the construction phase. For instance, if the model training 214 is intended to train a model specific to the placement stage 108 (shown in FIG. 1), the output of the physical synthesis stage 106 may be used as a basis for the input feature set data 216. Similarly, the labeled output data 218 can additionally or alternatively be based on intermediate (partially optimized) data generated during the construction phase. For instance, if the model training 214 is intended to train a model specific to the logic synthesis stage 104 (shown in FIG. 1), the output of the logic synthesis stage 104 may be used as a basis for the labeled output data 218. In the context of the above example, data being "partially optimized" means that the data has been optimized through some of the stages 104, 106, 108, 110, 112 of FIG. 1 but not all of the stages. In other examples, data may be "partially optimized" in that one or more iterations through a particular stage 104, 106, 108, 110, 112 have been completed but a final optimization has not yet been completed.

While FIG. 2 shows the input feature set data 216 is based on a single instance of input design state data 204 and the labeled output data 218 is based on a single instance of the output design state data 208, in some examples, the full set of training data (both the input design state data 204 and the labeled output data 218) are based on multiple instanced of design state data. Furthermore, different instances of the design state data are selected to correspond to different types of circuit designs to provide variability in the data. Such variability increases the robustness of the resulting machine learning model to be applied to different types of data. In some examples, the particular types of design state data can be selected based on the particular needs or focus of the machine learning model to be trained.

On a general level, machine learning models disclosed herein are trained using supervised training techniques that involve the use of training data that includes first circuit design data (also referred to herein as input design state data) corresponding to an input to the portions(s) of the EDA tool to be modelled and second circuit design data (also referred to herein as output design state data) corresponding to an output of the EDA tool after processing (e.g., optimizing) of the first circuit design data. Thus, the first circuit design data is also referred to herein as unoptimized circuit design data (or unoptimized design state data) and the second circuit design data is also referred to herein as optimized circuit design data (or optimized design state data). Stated differently, the information or data used as inputs and or generated as an output at any stage in the circuit design process is generically referred to herein as circuit design data. Thus, both the input design state data 204 and the output design state data 208 are collectively referred to herein as circuit design data. Furthermore, intermediate data generated during the construction phase is also referred to as circuit design data. Generally speaking, design circuit data from both before and after the execution of an EDA tool is used as the basis for training data to train a model that will predict the output of the EDA tool.

The nature and content of the circuit design data used to train a particular model depends on the aspects, features, or parameters of the circuit design of interest as well as the aspects of the EDA tool that are to be modelled. For instance, features of interest to model the output of an EDA tool implementing the logic synthesis stage 104 correspond to attributes of the standard cells and/or the paths (e.g., timing paths) connecting the standard cells that are defined by the gate-level description (netlist description) generated by logic synthesis. More particularly, features of interest for a machine learning model that predicts the output of the logic synthesis stage 104 can be divided into broad categories including node level features and path level features. As used herein, a node refers to a particular output of a standard cell. Many standard cells have only one output such that the node effectively corresponds to the standard cell. However, some standard cells have multiple outputs and, therefore, correspond to multiple nodes. As used herein, a path refers to a timing path corresponding to a sequence, series, or string of connected cells (e.g., combinational elements) with start and end points (e.g., defined by sequential elements and/or by input and/or output ports) that define a full sequence of operations that must be completed within a single clock cycle to satisfy the timing requirements of the circuit.

Node level features that may be of interest to predict through machine learning include a functionality associated with the node, a drive strength associated with the node, a fan-in count associated with the node, a fan-out count associated with the node, a maximum (or worst) slack associated with the node, a worst path phase associated with the node, a worst path depth associated with the node, and a delay per level allowance associated with the node. As its name implies, the functionality of a node corresponds to the functionality or type of cell corresponding to the node (e.g., particular type of logic gate or sequential element). The drive strength of a node refers to the ability of the corresponding cell to charge or discharge a capacitance load at its output (to drive a value to a next cell connected to the output). The fan-in count can correspond to a basic/next/immediate fan-in count or to a cumulative fan-in count. The basic/next/immediate fan-in count refers to the number of inputs directly associated with a given cell. The cumulative fan-in count refers to the total number of inputs associated with a given cell and the inputs of all other cells connected upstream of the inputs of the given cell along any timing path passing through the given cell. The fan-out count can correspond to a basic/next/immediate fan-out count or a cumulative fan-out count. The basic/next/immediate fan-out count for a given output of a first cell (e.g., a given node) refers to the number of inputs of downstream cells directly connected with the given output of the first cell. The cumulative fan-out count refers to the total number of inputs of all cells connected downstream of a given output of a first cell along any timing path passing through the given output of the first cell. Slack is the difference between the actual time and the target time for completion of a timing path. Thus, the maximum (or worst) slack for a given node is the slack that is the maximum or worst among all timing paths that include or pass through the given node. The worst path phase associated with a given node corresponds to the worst (e.g., longest) actual time for completion of all paths that include or pass through the given node. The path depth corresponds to the number of cells in the sequence or string of cells of a given path. Generally, a greater depth (e.g., a greater number of cells) corresponds to a slower timing path. Thus, the worst path depth associated with a node corresponds to the number of cells in the longest path that includes or passes through the node. The delay per level allowance associated with a given node corresponds to the lowest ratio of path phase to path depth among all paths that include or pass through the given node. Some or all of the above node level features may be extracted from circuit design data for training purposes and serve as EDA optimization parameters predicted by a machine learning model. In other examples, other node level features may additionally or alternatively be used.

Path level features that may be of interest to predict through machine learning include a sequence, string, or pattern of the cells in the path (e.g., . . . . NAND2→AND2→OR2→AOI22→NAND3→NOR2→ . . . ), an identifier of the path, a slack of the path, a start clock associated with the path, an end clock associated with the path, an available phase for the path, a dominant exception associated with the path, and/or a count of the types of cells in the path. In some examples, the types of cells are categorized between simple combinational elements (e.g., 2 input logic gates), complex combinational elements (3 or more input logic gates), sequential elements (e.g., latches, flipflops), and buffers or inventors. Other divisions of the types of cells in a path may alternatively be used. Some or all of the above path level features may be extracted from circuit design data for training purposes and serve as EDA optimization parameters predicted by a machine learning model. In other examples, other node level features may additionally or alternatively be used. Further, in some examples, a combination of node level features and path level features may be used to train a machine learning model to predict such EDA output parameters in accordance with teachings disclosed herein.

Once trained the model is deployed (represented by block 220 in FIG. 2) for operation in an inference phase (e.g., the bottom box 212) to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Furthermore, in some examples, the output data may undergo post-processing after it is generated by the AI model to transform the output into a useful result (e.g., a display of data, an instruction to be executed by a machine, etc.).

As shown in the illustrated example of FIG. 2, the input to the deployed model 220 is unoptimized design state data 222 (e.g., unoptimized circuit design data). In some examples, the unoptimized design state data 222 is comparable to the input design state data 204 used as the input to the EDA tool(s) 206 executed to implement the construction phase of the circuit design process. That is, in some examples, the unoptimized design state is based on and/or corresponds to an RTL description of a circuit design. In some examples, pre-processing is implemented on the RTL description to enable the extraction of specific features or data of interest that serves as the unoptimized design state data 222 provided as an input to the model 220. For instance, many of the node level features and path level features cannot be directly extracted from the RTL description because the RTL description describes a circuit at too high a level of abstraction. Accordingly, in some examples, the RTL description is processed through synthesis to generate a gate-level description (e.g., a netlist description) from which the path and node level features can be extracted. In some such examples, the synthesis of the RTL description is performed without optimization. Thus, such a synthesis process is not the same as going through the complete set of iterations through the logic synthesis stage 104 and the physical synthesis stage 106 of FIG. 1 discussed above. As such, synthesis without optimization is not subject to the long delays that arise for full optimization. In some examples, a full layout description of the circuit (which provides more detail than the netlist description) may additionally or alternatively be used as an input to the machine learning model (and/or during the training phase) if such data is available.

In the illustrated example of FIG. 2, the output of the model 220 in the inference phase is predicted output design state data 224 (e.g., predicted or optimized circuit design data). In some examples, the predicted output design state data 224 is comparable to the output design state data 208 that is the final result output by the EDA tool(s) 206 executed to implement the construction phase of the circuit design process. However, in some examples, the predicted output design state data 224 cannot be used as a replacement for the output design state data 208 of the EDA tool(s) 206 because the predicted output design state data 224 is not a complete solution to the complex optimization problem solved by the EDA tool(s) 206. Rather, in some examples, the predicted output design state data 224 includes predicted values for one or more design parameters of interest to circuit engineers. As disclosed in further detail below, the particular design parameters of interest are what the model 220 is trained to predict. Thus, in some example, multiple different models can be trained that focus on different design parameters of interest with any particular model be selected for execution depending on the needs of a circuit engineer and/or the progress through the circuit design process.

For instance, an example machine learning model may be trained to predict output parameters optimized by the logic synthesis stage 104 may predict the depth of (e.g., number of standard cells arranged in sequence in) particular timing paths in a circuit. Additionally or alternatively, the example model may predict the particular pattern, string or sequence of the standard cells within the timing paths of the circuit. Another example machine learning model may be trained to predict output parameters optimized by the physical synthesis stage 106 include optimizations to the library cell family, drive strength, and threshold voltage. In some examples, a single machine learning model that predicts the above output parameters associated with both the logic synthesis stage 104 and the physical synthesis stage 106. Other parameters can be predicted by other trained models and/or incorporated into a more complex overall machine learning model. Further, as noted above, examples disclosed herein are not limited to predict the output of EDA tools associated with the synthesis stage, but can apply to any stage(s) in the construction phase and/or any stages within the sign-off phase of the circuit design process. Other specific example parameters that may be predicted by machine learning models trained in accordance with teachings disclosed herein include virtual and physical wire length, different power state optimization modelling, clock insertion delay and clock tree optimization modelling, congestion and DRC related optimization modelling, DFT/scan/reset tree related modelling, and so forth.

Figure 3:
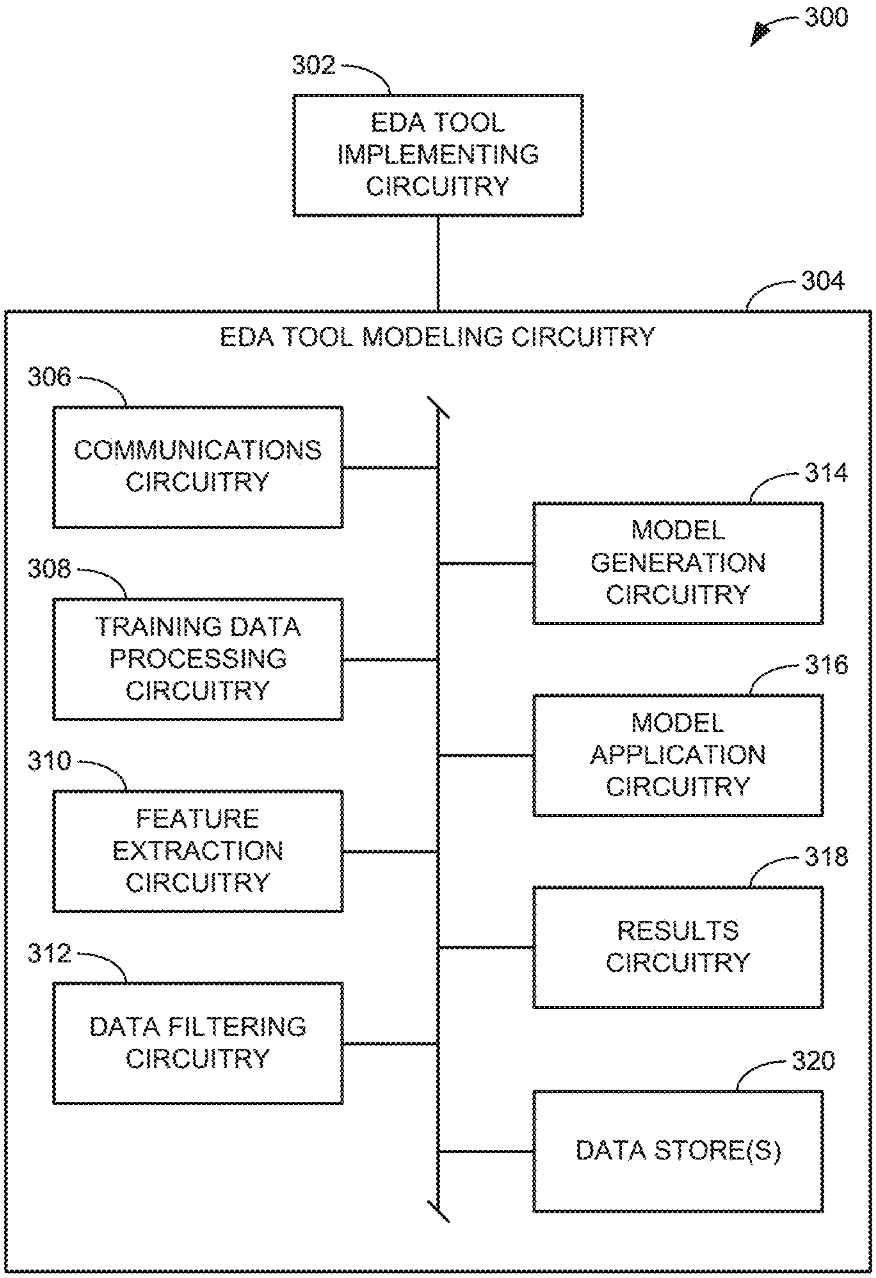
FIG. 3 is a block diagram of an example environment that includes example EDA tool modeling circuitry constructed in accordance with teachings disclosed herein.

FIG. 3 is a block diagram of an example environment 100 in which teachings disclosed herein may be implemented. The example environment 100 includes EDA tool implementing circuitry 302 and an example implementation of EDA tool modeling circuitry 304. In the illustrated example, the EDA tool implementing circuitry 302 and the EDA tool modeling circuitry 304 are separate and distinct. However, in other examples, the EDA tool implementing circuitry 302 and the EDA tool modeling circuitry 304 may be combined and/or implemented by the same programmable circuitry.

The EDA tool implementing circuitry 302 of FIG. 3 implements or executes one or more EDA tools to analyze, process, and/or optimize circuit design data defining the components (e.g., standard cells), associated connections (e.g., both logical and physical), and overall design of a circuit. Thus, the EDA tool implementing circuitry 302 may be used to complete one or more of the logic synthesis stage 104, the physical synthesis stage 106, the placement stage 108, the CTS stage 110, and/or the routing stage 112 discussed above in connection with FIG. 1. Additionally or alternatively, the EDA tool implementing circuitry 302 may be used to complete operations associated with the sign-off phase of a circuit design process.

The example EDA tool modeling circuitry 304 of FIG. 3 generates and executes machine learning models that can be used to predict outputs of the EDA tools implemented by the EDA tool implementing circuitry 302. In some examples, the functionality of the EDA tool modeling circuitry 304 is divided between multiple computing devices and/or some of the functionality described herein may be omitted. For instance, in some examples, the functionality of the EDA tool modeling circuitry 304 is limited to generating models that are then provided to other computing devices for execution of the models. In such examples, the other computing devices may be either in proximity to or remotely located away from the EDA tool modeling circuitry 304. Further, in some examples, the functionality of the EDA tool modeling circuitry 304 is limited to executing a machine learning model generated and provided by a different computing device (which may or may not be remotely located relative to the EDA tool modeling circuitry 304).

The EDA tool modeling circuitry 304 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the EDA tool modeling circuitry 304 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

As shown in the illustrated example, the EDA tool modeling circuitry 304 includes example communications circuitry 306, example training data processing circuitry 308, example feature extraction circuitry 310, example data filtering circuitry 312, example model generation circuitry 314, example model application circuitry 316, example results circuitry 318, and example data store(s) 320.

The example communications circuitry 306 of FIG. 3 enables the EDA tool modeling circuitry 304 to communicate with and/or obtain outputs of the EDA tool implementing circuitry 302. In some examples, the communications circuitry 306 accesses a database from which the outputs of the EDA tool implementing circuitry 302 are stored and/or retrieved. Further, in some examples, the communications circuitry 306 enables the EDA tool modeling circuitry 304 to receive inputs from an end user (e.g., a circuit engineer) and/or to provide outputs to the end user (e.g., via a user interface). In some examples, the communications circuitry 306 is instantiated by programmable circuitry executing communications circuitry instructions and/or configured to perform operations such as those represented by the flowcharts of FIGS. 4-8.

In some examples, the EDA tool modeling circuitry 304 includes means for communicating. For example, the means for communicating may be implemented by the communications circuitry 306. In some examples, the communications circuitry 306 may be instantiated by programmable circuitry such as the example programmable circuitry 912 of FIG. 9. For instance, the communications circuitry 306 may be instantiated by the example microprocessor 1000 of FIG. 10 executing machine executable instructions such as those implemented by at least blocks 402, 404, 702, 704, 710, 802 of FIGS. 4-8. In some examples, the communications circuitry 306 may be instantiated by hardware logic circuitry, which may be implemented by an ASIC, XPU, or the FPGA circuitry 1100 of FIG. 11 structured to perform operations corresponding to the machine readable instructions. Additionally or alternatively, the communications circuitry 306 may be instantiated by any other combination of hardware, software, and/or firmware. For example, the communications circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example training data processing circuitry 308 of FIG. 3 processes circuit design data to prepare, organize, and/or classify the data to enable and/or facilitate the extraction of relevant features to be used for model training. In some examples, the training data processing circuitry 308 is instantiated by programmable circuitry executing training data processing circuitry instructions and/or configured to perform operations such as those represented by the flowcharts of FIGS. 4-8.

In some examples, the training data processing circuitry 308 includes and/or uses machine learning to analyze and/or process the circuit design data to prepare training data for a machine learning model. For instance, as mentioned above, a potential feature of interest in predicting the output of an EDA tool executing the logic synthesis stage includes the pattern, string, or sequence of standard cells in a path. More particularly, a circuit engineer may be interested in mapping changes (or commonalities) in the sequence of cells in a path both before and after optimization. In some examples, the training data processing circuitry 308 implements an unsupervised learning algorithm to classify and label sequences of cells in different paths and/or segments of different paths obtained from raw circuit design data to identify particular sequences of high interest and/or of low interest to collect relevant feature sets and labeled sets of training data whiling reducing (e.g., avoiding, filtering) irrelevant data for more robust and/or effective training of a machine learning model that is to predict the outputs of an EDA tool. For instance, particular sequences of interests that may be identified through machine learning classification include dominant (most frequently occurring) sequences, sequences that most frequently remain unchanged before and after optimization by an EDA tool, sequences that most frequently change before and after optimization by an EDA tool, sequences and/or specific cells that most frequently change in a consistent manner before and after optimization by an EDA tool, etc. Some example dominant (frequently occurring) sequences include paths with a threshold proportion of standard cells that are inverters or buffers, a threshold proportion of standard cells that are back to back buffers, a threshold proportion of standard cells that are back to back inverters, a threshold proportion of standard cells that are back to back NAND2 gates, a threshold proportion of standard cells that are back to back NOR2 gates, a threshold proportion of standard cells that are XOR2 gates, a threshold proportion of standard cells that are complex (e.g., have 3 or more inputs), and a threshold proportion of standard cells that are back to back complex cells. In such examples, the threshold proportion may be any suitable value (e.g., 20%, 20%, 40%, 50%, etc.)

Some of the example sequences of interest noted above may be of direct relevance in enabling a machine learning model to predict the output of an EDA tool. In other instances, these sequences may be of indirect interest by simplifying or otherwise facilitating the training of the machine learning model. For example, particular cells or sequences of cells that do not change before and after optimization may be identified and defined as constants to enable the sequence of a full timing path to be divided into smaller chunks or segments (separated by the fixed or constant cells) for more efficient analysis. In some examples, this sort of pre-processing of design circuit data is performed by the training data processing circuitry 308. In other examples, other types of preprocessing may be performed to obtain different types of datasets for different machine learning applications (e.g., to model different parts of the construction phase and/or the sign-off phase of the design circuit process).

In some examples, the EDA tool modeling circuitry 304 includes means for processing circuit design data and/or training data. For example, the means for processing may be implemented by the training data processing circuitry 308. In some examples, the training data processing circuitry 308 may be instantiated by programmable circuitry such as the example programmable circuitry 912 of FIG. 9. For instance, the training data processing circuitry 308 may be instantiated by the example microprocessor 1000 of FIG. 10 executing machine executable instructions such as those implemented by at least blocks 402, 406, 502, 504, 506, 510, 512, 514, 602, 604, 606, 608, 610, 612, 702, 704, 710, 802 of FIGS. 4-8. In some examples, the training data processing circuitry 308 may be instantiated by hardware logic circuitry, which may be implemented by an ASIC, XPU, or the FPGA circuitry 1100 of FIG. 11 structured to perform operations corresponding to the machine readable instructions. Additionally or alternatively, the training data processing circuitry 308 may be instantiated by any other combination of hardware, software, and/or firmware. For example, the training data processing circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example feature extraction circuitry 310 of FIG. 3 extracts specific features of interest from design circuit data for use in training a machine learning model. As noted above, in some examples, such features are extracted from circuit design data that has already been processed (e.g., classified, organized, etc.) by the training data processing circuitry 308. The circuit design data can be, for example, a full chip netlist description, a partition netlist description, a portion of a netlist description (e.g., a partial netlist), a full chip layout, a portion of a chip layout (e.g., a partial layout), an output of any one of the stages 104, 106, 108, 110, 112 of FIG. 1, etc. In some examples, the feature extraction circuitry 310 extracts features from circuit design data that may be used as inputs to a machine learning model during an inference phase.

The particular features extracted from the circuit design data depends on the EDA tool output parameters to be modelled. As discussed above, some such parameters correspond to node level attributes including fan-in (immediate and cumulative), fan-out (immediate and cumulative), the type of fan-in and/or fan-out (e.g., main and other legs), the size and type of timing point, current depth, max depth (e.g., overall depth), current slack, overall slack (worst slack), synthesis constraints (e.g., path phase, MCP, frequency, etc.), and so forth. Further, extracted features can correspond to EDA output parameters associated with path level attributes including timing nodes and their connectivity, depth divisions (e.g., placement of buffers and inverters), the types and/or associated number of types of standard cells (e.g., simple elements (2 input logic gates), complex elements (3 or more input logic gates), sequential elements (latches or flops)), the slack, and synthesis constraints (e.g., path phase, MCP, etc.), and so forth. Additionally, extracted features can correspond to EDA output parameters associated with design level attributes including the percentage of occurrences of transformations (e.g., levelling and block features), the total number of unique nodes, the utilization and/or congestion in an area, aspect ratio, etc. In some examples, the feature extraction circuitry 310 is instantiated by programmable circuitry executing feature extraction circuitry instructions and/or configured to perform operations such as those represented by the flowcharts of FIGS. 4-8.

In some examples, the EDA tool modeling circuitry 304 includes means for extracting features from circuit design data. For example, the means for extracting features may be implemented by the feature extraction circuitry 310. In some examples, the feature extraction circuitry 310 may be instantiated by programmable circuitry such as the example programmable circuitry 912 of FIG. 9. For instance, the feature extraction circuitry 310 may be instantiated by the example microprocessor 1000 of FIG. 10 executing machine executable instructions such as those implemented by at least blocks 408, 410, 502, 602, 804 of FIGS. 4-8. In some examples, the feature extraction circuitry 310 may be instantiated by hardware logic circuitry, which may be implemented by an ASIC, XPU, or the FPGA circuitry 1100 of FIG. 11 structured to perform operations corresponding to the machine readable instructions. Additionally or alternatively, the feature extraction circuitry 310 may be instantiated by any other combination of hardware, software, and/or firmware. For example, the feature extraction circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example data filtering circuitry 312 of FIG. 3 filters the extracted features to remove outliers and/or other data that is not needed for training of the machine learning model. More particularly, in some examples, the data filtering circuitry 312 filters raw data (which may or may not have been pre-processed) to create more bias on data that an EDA tool will likely spend time to optimize while deemphasizing data that the EDA tool may not significantly alter (if at all) during the optimization process. For instance, one objective of the optimization process of the logic synthesis stage 104 is to define timing paths with a sequence and depth that meets timing requirements for the circuit. Generally speaking, longer paths (e.g., paths with a higher depth) take longer to complete. As such, it is likely that an EDA tool will spend more time modifying timing paths with a higher depth than timing paths that are relatively short. Indeed, if a particular unoptimized path is sufficiently short so that it already more that satisfies the timing requirements (e.g., it has a positive slack), there is no need for the EDA tool to modify (e.g., optimize) the path. Accordingly, in some examples, the data filtering circuitry 312 filters out or removes such paths from the training data as they are unlikely to provide much meaning to the machine learning model and merely serve to reduce the efficiency of the training. Indeed, in some examples, including such data can dilute cause deviations in the quality of the training. Accordingly, filtering out such data can improve training efficiency and improve model accuracy.

As another example, some particular sequences, patterns, or strings of standard cells within a timing path (regardless of the path depth) may more commonly be modified by EDA tools than other sequences. Accordingly, in some examples, the data filtering circuitry 312 identifies specific sequences that are frequently modified for inclusion in the training data while other sequences that are unmodified are filtered out. In some examples, the ability of the data filtering circuitry 312 to distinguish between such sequences is based on the machine learning based classification of the sequences of timing paths performed by the training data processing circuitry 308 discussed above. In some examples, the data filtering circuitry 312 is instantiated by programmable circuitry executing data filtering circuitry instructions and/or configured to perform operations such as those represented by the flowcharts of FIGS. 4-8.

In some examples, the EDA tool modeling circuitry 304 includes means for filtering data. For example, the means for filtering may be implemented by the data filtering circuitry 312. In some examples, the data filtering circuitry 312 may be instantiated by programmable circuitry such as the example programmable circuitry 912 of FIG. 9. For instance, the data filtering circuitry 312 may be instantiated by the example microprocessor 1000 of FIG. 10 executing machine executable instructions such as those implemented by at least blocks 412, 512, 604, 806 of FIGS. 4-8. In some examples, the data filtering circuitry 312 may be instantiated by hardware logic circuitry, which may be implemented by an ASIC, XPU, or the FPGA circuitry 1100 of FIG. 11 structured to perform operations corresponding to the machine readable instructions. Additionally or alternatively, the data filtering circuitry 312 may be instantiated by any other combination of hardware, software, and/or firmware. For example, the data filtering circuitry 312 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example model generation circuitry 314 of FIG. 3 generates a machine learning model that can be applied to circuit design data to predict an output of an EDA tool processing the circuit design data. More particularly, in some examples, the model generation circuitry 314 trains the model and verifies the accuracy of the model using the training data generated by the training data processing circuitry 308, the feature extraction circuitry 310, and/or the data filtering circuitry 312. In some examples, the model generation circuitry 314 is instantiated by programmable circuitry executing model generation circuitry instructions and/or configured to perform operations such as those represented by the flowcharts of FIGS. 4-8.

In some examples, the EDA tool modeling circuitry 304 includes means for generating, training, and/or validating a machine learning model. For example, the means for generating, training, and/or validating may be implemented by the model generation circuitry 314. In some examples, the model generation circuitry 314 may be instantiated by programmable circuitry such as the example programmable circuitry 912 of FIG. 9. For instance, the model generation circuitry 314 may be instantiated by the example microprocessor 1000 of FIG. 10 executing machine executable instructions such as those implemented by at least blocks 414, 416, 418, 706, 708, 712, 714 of FIGS. 4-8. In some examples, the model generation circuitry 314 may be instantiated by hardware logic circuitry, which may be implemented by an ASIC, XPU, or the FPGA circuitry 1100 of FIG. 11 structured to perform operations corresponding to the machine readable instructions. Additionally or alternatively, the model generation circuitry 314 may be instantiated by any other combination of hardware, software, and/or firmware. For example, the model generation circuitry 314 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example model application circuitry 316 of FIG. 3 executes a trained machine learning model or applies the model to features extracted from circuit design data to be analyzed. In some examples, the model application circuitry 316 is instantiated by programmable circuitry executing model application circuitry instructions and/or configured to perform operations such as those represented by the flowcharts of FIGS. 4-8.

In some examples, the EDA tool modeling circuitry 304 includes means for applying and/or executing a machine learning model. For example, the means for applying and/or executing may be implemented by the model application circuitry 316. In some examples, the model application circuitry 316 may be instantiated by programmable circuitry such as the example programmable circuitry 912 of FIG. 9. For instance, the model application circuitry 316 may be instantiated by the example microprocessor 1000 of FIG. 10 executing machine executable instructions such as those implemented by at least blocks 712, 714, 808 of FIG. 7. In some examples, the model application circuitry 316 may be instantiated by hardware logic circuitry, which may be implemented by an ASIC, XPU, or the FPGA circuitry 1100 of FIG. 11 structured to perform operations corresponding to the machine readable instructions. Additionally or alternatively, the model application circuitry 316 may be instantiated by any other combination of hardware, software, and/or firmware. For example, the model application circuitry 316 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example results circuitry 318 of FIG. 3 generates or provides (e.g., via the communications circuitry 306) results of the machine learning model that predicts or estimates an output of an EDA tool that processes the same circuit design data used as the input for the machine learning model. The particular results of the machine learning model depend on the output parameters that the model was trained to predict. That is, in some examples, the results of the model may be more limited and focused than the full optimized solution output by the EDA tool. For instance, in some examples, the results of the learning model may correspond to summary statistics that generally characterize the circuit design. As an example, in the context of a model for the logic synthesis stage 104, the results may predict a final depth for a given timing path (e.g., the number of cells in a full sequence of the path) after optimization through an EDA tool. In other examples, more detailed and/or specific information about the optimized circuit design following optimization by the EDA tool may be predicted. For instance, rather than merely predicting the depth of a path, in some examples, the machine learning model may predict the particular sequence (or at least portions thereof) of a particular timing path. In some examples, the results circuitry 318 is instantiated by programmable circuitry executing results circuitry instructions and/or configured to perform operations such as those represented by the flowchart of FIGS. 4-8.

In some examples, the EDA tool modeling circuitry 304 includes means for generating, providing, and/or outputting results of a machine learning model. For example, the means for generating, providing, and/or outputting may be implemented by the results circuitry 318. In some examples, the results circuitry 318 may be instantiated by programmable circuitry such as the example programmable circuitry 912 of FIG. 9. For instance, the results circuitry 318 may be instantiated by the example microprocessor 1000 of FIG. 10 executing machine executable instructions such as those implemented by at least block 810 of FIG. 8. In some examples, the results circuitry 318 may be instantiated by hardware logic circuitry, which may be implemented by an ASIC, XPU, or the FPGA circuitry 1100 of FIG. 11 structured to perform operations corresponding to the machine readable instructions. Additionally or alternatively, the results circuitry 318 may be instantiated by any other combination of hardware, software, and/or firmware. For example, the results circuitry 318 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example data store(s) 320 of FIG. 3 store the circuit design data (either before or after processing), store the extracted features used for training purposes, store the machine learning model once trained, and/or store extracted features to be analyzed by the trained model, and/or store the results output by the trained model.

In some examples, the EDA tool modeling circuitry 304 includes means for storing data. For example, the means for storing may be implemented by the data store(s) 320. In some examples, the data store(s) 320 may be instantiated by programmable circuitry such as the example programmable circuitry 912 of FIG. 9. For instance, the data store(s) 320 may be instantiated by the example microprocessor 1000 of FIG. 10 executing machine executable instructions such as those implemented by at least block 422 of FIG. 4. In some examples, the data store(s) 320 may be instantiated by hardware logic circuitry, which may be implemented by an ASIC, XPU, or the FPGA circuitry 1100 of FIG. 11 structured to perform operations corresponding to the machine readable instructions. Additionally or alternatively, the data store(s) 320 may be instantiated by any other combination of hardware, software, and/or firmware. For example, the data store(s) 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the EDA tool modeling circuitry 304 is illustrated in FIG. 3, one or more of the elements, processes, and/or devices illustrated in FIG. 3 may be combined, divided, re-arranged, omitted, eliminated, and/or implemented in any other way. Further, the example communications circuitry 306, the example training data processing circuitry 308, the example feature extraction circuitry 310, the example data filtering circuitry 312, the example model generation circuitry 314, the example model application circuitry 316, the example results circuitry 318, the example data store(s) 320, and/or, more generally, the example EDA tool modeling circuitry 304 of FIG. 3, may be implemented by hardware alone or by hardware in combination with software and/or firmware. Thus, for example, any of the example communications circuitry 306, the example training data processing circuitry 308, the example feature extraction circuitry 310, the example data filtering circuitry 312, the example model generation circuitry 314, the example model application circuitry 316, the example results circuitry 318, the example data store(s) 320, and/or, more generally, the example EDA tool modeling circuitry 304, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example EDA tool modeling circuitry 304 of FIG. 3 may include one or more elements, processes, and/or devices in addition to, or instead of, those illustrated in FIG. 3, and/or may include more than one of any or all of the illustrated elements, processes and devices.

Flowcharts representative of example machine readable instructions, which may be executed by programmable circuitry to implement and/or instantiate the EDA tool modeling circuitry 304 of FIG. 3 and/or representative of example operations which may be performed by programmable circuitry to implement and/or instantiate the EDA tool modeling circuitry 304 of FIG. 3, is shown in FIGS. 4-8. The machine readable instructions may be one or more executable programs or portion(s) of one or more executable programs for execution by programmable circuitry, such as the programmable circuitry 912 shown in the example processor platform 900 discussed below in connection with FIG. 9 and/or may be one or more function(s) or portion(s) of functions to be performed by the example programmable circuitry discussed below in connection with FIGS. 10 and/or 11. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums located in one or more hardware devices. Further, although the example program is described with reference to the flowcharts illustrated in FIGS. 4-8, many other methods of implementing the example EDA tool modeling circuitry 304 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) configured and/or structured to perform the corresponding operation without executing software or firmware. The programmable circuitry may be distributed in different network locations and/or local to one or more hardware devices (e.g., a single-core processor (e.g., a single core central processor unit (CPU)), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-8 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase “at least one of A and B” is intended to refer to implementations including any of (1) at least one A, (2) at least one B, or (3) at least one A and at least one B. Similarly, as used herein in the context of describing structures, components, items, objects and/or things, the phrase “at least one of A or B” is intended to refer to implementations including any of (1) at least one A, (2) at least one B, or (3) at least one A and at least one B. As used herein in the context of describing the performance or execution of processes, instructions, actions, activities and/or steps, the phrase “at least one of A and B” is intended to refer to implementations including any of (1) at least one A, (2) at least one B, or (3) at least one A and at least one B. Similarly, as used herein in the context of describing the performance or execution of processes, instructions, actions, activities and/or steps, the phrase “at least one of A or B” is intended to refer to implementations including any of (1) at least one A, (2) at least one B, or (3) at least one A and at least one B.

As used herein, singular references (e.g., “a”, “an”, “first”, “second”, etc.) do not exclude a plurality. The term “a” or “an” object, as used herein, refers to one or more of that object. The terms “a” (or “an”), “one or more”, and “at least one” are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
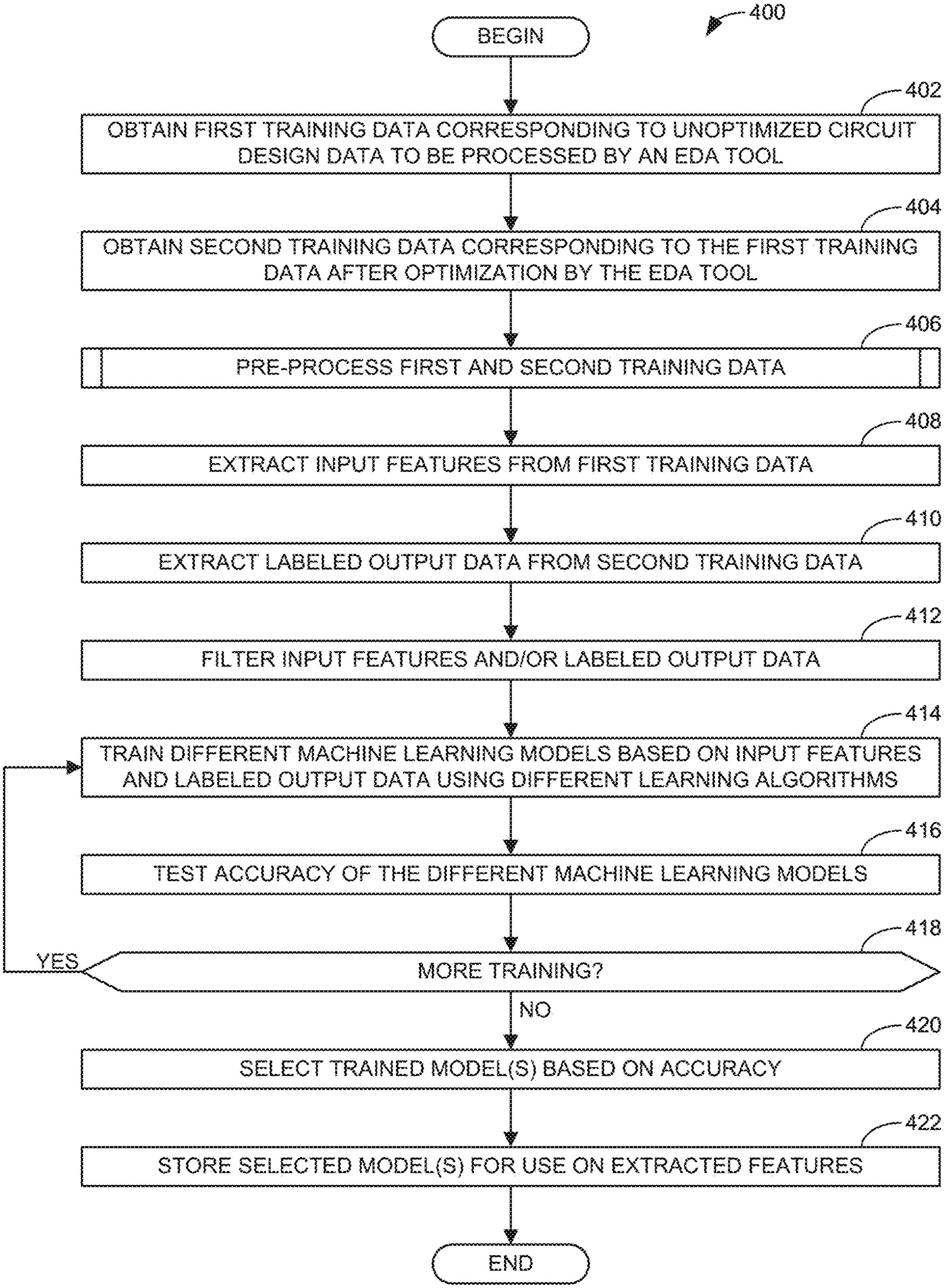
FIGS. 4-8 are flowcharts representative of example machine readable instructions and/or example operations that may be executed by example programmable circuitry to implement the example EDA tool modeling circuitry of FIG. 3.

FIG. 4 is a flowchart representative of example machine readable instructions and/or example operations 400 that may be executed and/or instantiated by processor circuitry to generate a machine learning model to predict the output of an EDA tool prior to (without having to) execute the EDA tool. The machine readable instructions and/or the operations 400 of FIG. 4 begin at block 402, at which the example communications circuitry 306 and/or the training data processing circuitry 308 obtains first training data corresponding to unoptimized circuit design data to be processed by an EDA tool. At block 404, the example communications circuitry 306 obtains second training data corresponding to the first training data after optimization by the EDA tool. The nature of the first and second training data depends on the aspect(s) of the EDA tool that is to be modelled. In some examples, a particular stage in the constructions phase of the circuit design process (e.g., any one of the logic synthesis stage, 104, the physical synthesis stage 106, the placement stage 108, the CTS stage 110, or the routing stage 112) are modelled in which case the first (unoptimized) training data corresponds to an input to the particular stage and the second (optimized) training data corresponds to an output of the particular stage. In some examples, more than one (e.g., some or all) of the stages in the construction phase are modelled, in which case the first training data is an input to the first relevant stage being modelled and the second training data corresponds to an output of the last relevant stage to be modelled. In some examples, one or more stages in the sign-off phase of the circuit design process may be modelled instead of those in the construction phase. In such examples, relevant input and output data associated with the stage of interest is identified and obtained as the first and second training data.

At block 406, the example training data processing circuitry 308 pre-processes the first and second training data. The particular way in which the training data is pre-processed depends on the nature of the training data to be processed as well as the particular features or parameters that are to be modelled by the machine learning model. For instance, if the parameters to be modelled include parameters indicative of the structure, pattern, or sequence of standard cells within timing paths of the circuit being designed, the training data processing circuitry 308 may process the training data to classify different patterns or sequences in the training data to facilitate the training process. An example process to implement block 406 to pre-process training data in this manner is provided below in connection with FIG. 5. However, in other examples, where different types of training data are involved and/or the machine learning model is to predict different types of parameters, different pre-processing techniques may be used. For instance, another example process includes converting or transforming the training data into graph data that is then analyzed using a graph convolution network (GCN) to classify features or aspects of the training data prior to actually training the model. An example process to implement block 406 to pre-process training data using a GCN is provided below in connection with FIG. 6.

At block 408, the example feature extraction circuitry 310 extracts input features from the first training data. At block 410, the example feature extraction circuitry 310 extracts labeled output data from the second training data. In some examples, the labels used for the output data are based on the pre-processing of the second training data performed at block 406. At block 412, the example data filtering circuitry 312 filters the input features and/or the labeled output data. In some examples, the input features and/or the labelled output data is filtered to focus on aspects of the data that are expected to be a significant focus of the EDA tool during the optimization process.

At block 414, the example model generation circuitry 314 trains different machine learning models based on input features and labeled output data using different learning algorithms. In some examples, the different learning algorithms are used to generate different machine learning models that predict different parameters to be output by the EDA tool. In some examples, different algorithms are used to generate different machine learning models that predict the same parameter(s) to be output by the EDA tool. In such examples, the different machine learning models can be compared to determine if one model is better than the other. In some examples, only one machine learning model is generated using only one learning algorithm. The particular type(s) of learning algorithm(s) employed depends on the nature of the parameters of interest to be modelled.

At block 416, the example model generation circuitry 314 tests the accuracy of the different machine learning models. In some examples, the accuracy of a model is tested by applying the trained model to a set of unoptimized circuit design data and comparing the outcome to corresponding optimized circuit design data. At block 418, the example model generation circuitry 314 determines whether to do more training. In some examples, this determination is made based on whether the accuracy for a given model satisfies a given threshold. For example, training may continue until the model error is less than a threshold (e.g., 1%, 2%, 5%, 10%, etc.). In other examples, other factors may additionally or alternatively be used to determine whether to continue or stop training. For example, training may stop after an amount of time has elapsed, after a number of training iterations have occurred, etc. If, at block 418, the example model generation circuitry 314 determines to perform more training, control returns to block 414. If no further training is to be performed, control advances to block 420 where the model generation circuitry selects the trained model(s) based on the accuracy. That is, in cases where multiple alternative models were trained (based on different learning algorithms), only some of the models may be selected for use. In some examples, all trained models are selected for use. At block 422, the example data store(s) 320 stores the selected trained model(s) for use on extracted features. Thereafter, the example flowchart of FIG. 4 ends.

Figure 5:
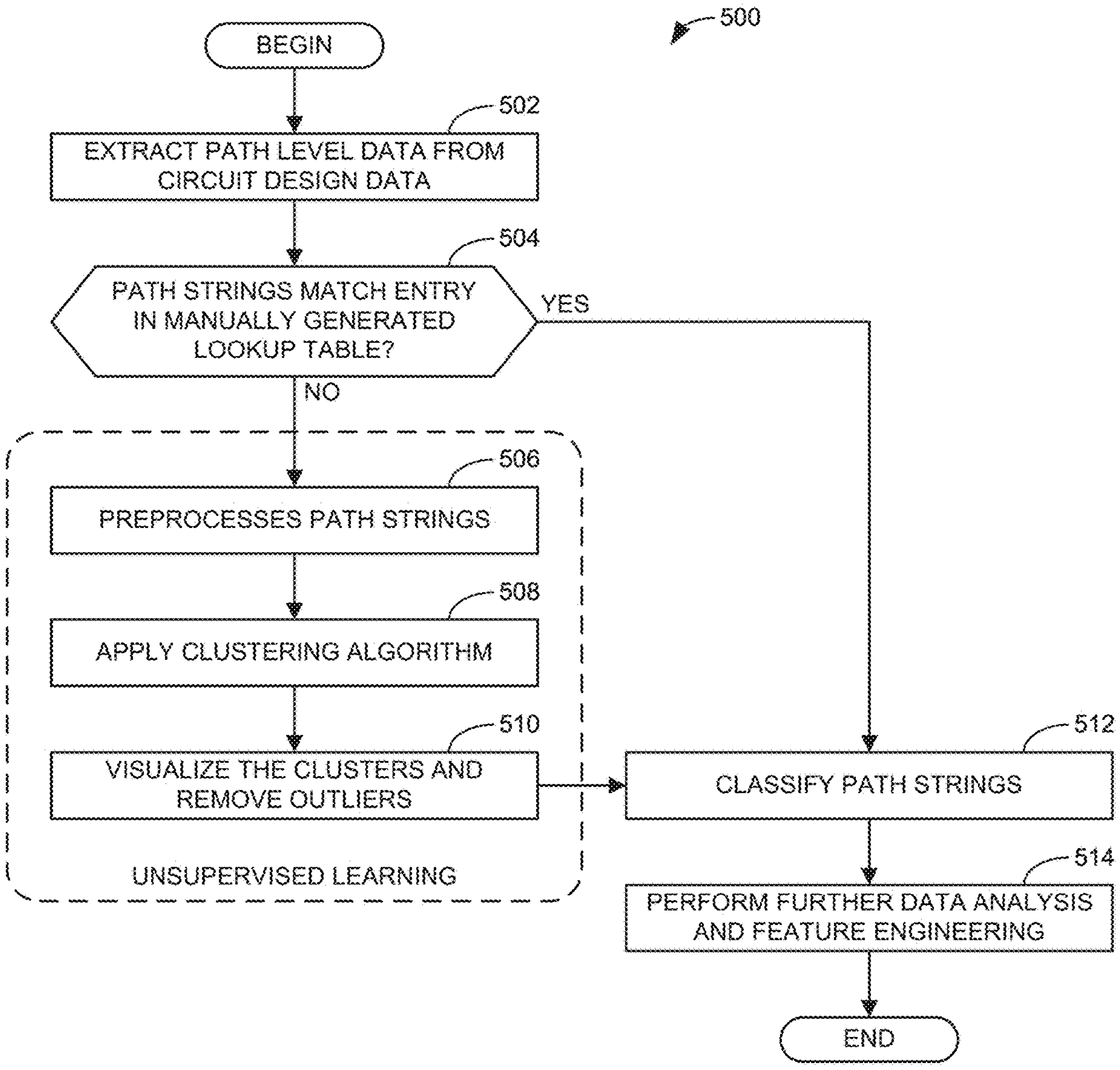

FIG. 5 is a flowchart representative of example machine readable instructions and/or example operations 500 that may be executed and/or instantiated by processor circuitry to classify timing paths in a circuit design based on the path string (e.g., the sequence of standard cells) of the paths. The flowchart of FIG. 5 is an example implementation of block 406 of FIG. 4. The machine readable instructions and/or the operations 500 of FIG. 5 begin at block 502, at which the example training data processing circuitry 308 and/or the example feature extraction circuitry 310 extracts path level data from circuit design data. In this example, the path level data includes path strings defining the pattern or sequence of standard cells in different timing paths of a circuit design. At block 504, the example training data processing circuitry 308 determines whether path strings match entries in a manually generated lookup table. In this example, it is assumed that at least some path strings (e.g., for relatively simple paths) have been manually organized and tabulated. If there is a match, control advances to block 512. However, if there is no match (e.g., the particular path under consideration is a relatively complex path that was not manually classified), control advances to block 506. In some examples, the manual generation of a lookup table is omitted. In such examples, block 504 may be omitted and control advances directly to block 506.

At block 506, the example training data processing circuitry 308 preprocesses the path strings. At block 508, the example training data processing circuitry applies a clustering algorithm. In some examples, the clustering algorithm is the Balance Iterative Reducing and Clustering using Hierarchies (BIRCH) algorithm. However, any other suitable clustering algorithm may additionally or alternatively be used. At block 510, the example training data processing circuitry 308 and/or the example data filtering circuitry 312 visualizes the cluster and removes outliers. As indicated in FIG. 5, the processing of the path strings, applying a clustering algorithm, and visualizing the clusters and removing outliers is a form of unsupervised learning. Thereafter, control advances to block 512.

At block 512, the example training data processing circuitry 308 classifies the path strings. In some examples, the path strings are classified based on their length (e.g., path depth). In some examples, the path strings are classified based on the sequence of the standard cells arranged in the path strings. More particularly, in some examples, only path strings with identical sequences are classified together. In other examples, path strings that have matching segments are classified together (even if other portions of the path strings do not match). In some examples, recurring segments in the path strings are classified together regardless of their association with other portions of the path strings. In some examples, at block 514, example training data processing circuitry 308 performs further data analysis and feature engineering. Thereafter, the example flowchart of FIG. 5 ends.

Figure 6:
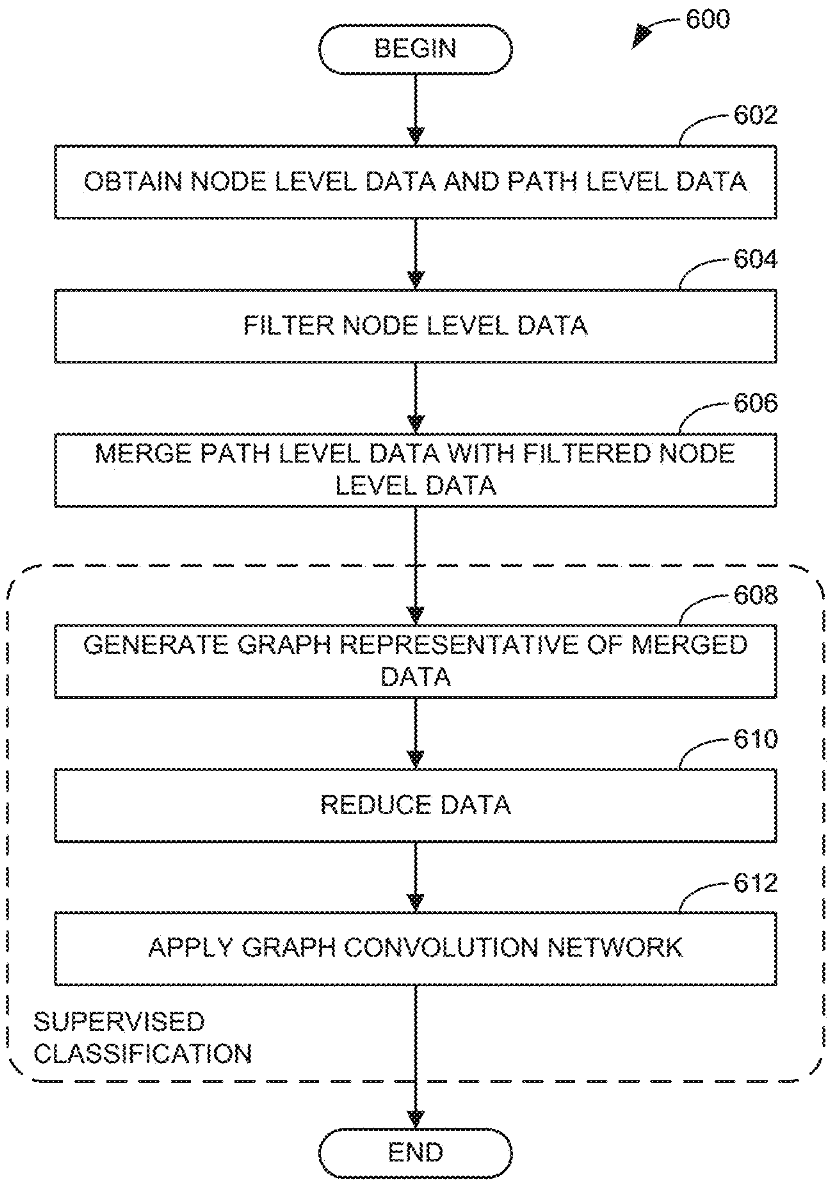

FIG. 6 is a flowchart representative of example machine readable instructions and/or example operations 600 that may be executed and/or instantiated by processor circuitry to classify node level data and path level data in a circuit design using graph-based supervised learning. The flowchart of FIG. 6 is another example implementation of block 406 of FIG. 4. The machine readable instructions and/or the operations 600 of FIG. 6 begin at block 602, at which the example training data processing circuitry 308 obtains node level data and path level data. In some examples, the node and path level data are extracted by the example feature extraction circuitry 310 from any suitable type of circuit design data such as, for example, a full chip netlist description, a partition netlist description, a full chip layout, etc.

At block 604, the example training data processing circuitry 308 and/or the data filtering circuitry 312 filters the node level data. The nature of the filtering can depend on the features or interest to be analyzed. As one example, the node level data may be filtered to include only node data associated with delays per stage greater than 50 and associated with path depths greater than 5 (e.g., only nodes included on paths that include 6 or more standard cells in sequence). At block 606, the example training data processing circuitry 308 merges the path level data with the filtered node level data. In some examples, the path level data corresponds to path identifiers associated with the paths containing the nodes included after the filtering at block 604.

At block 608, the example training data processing circuitry 308 generates a graph representative of the merged data. That is, the example training data processing circuitry 308 converts the original circuit design data (e.g., represented in an ASCII or text-based format) into a graph or image based form. In some examples, the generated graph is a directed acyclic graph (DAG). At block 610, the example training data processing circuitry 308 reduces the data. In some examples, there may be no data that can be reduced. Accordingly, in some examples, block 610 is omitted. At block 612, the example training data processing circuitry 308 applies a graph convolutional network (GCN) to classify the graph-represented data. As indicated in FIG. 6, the generation of the graph, data reduction, and subsequent analysis using a GCN is a form of supervised classification. Thereafter, the example flowchart of FIG. 6 ends.

Figure 7:
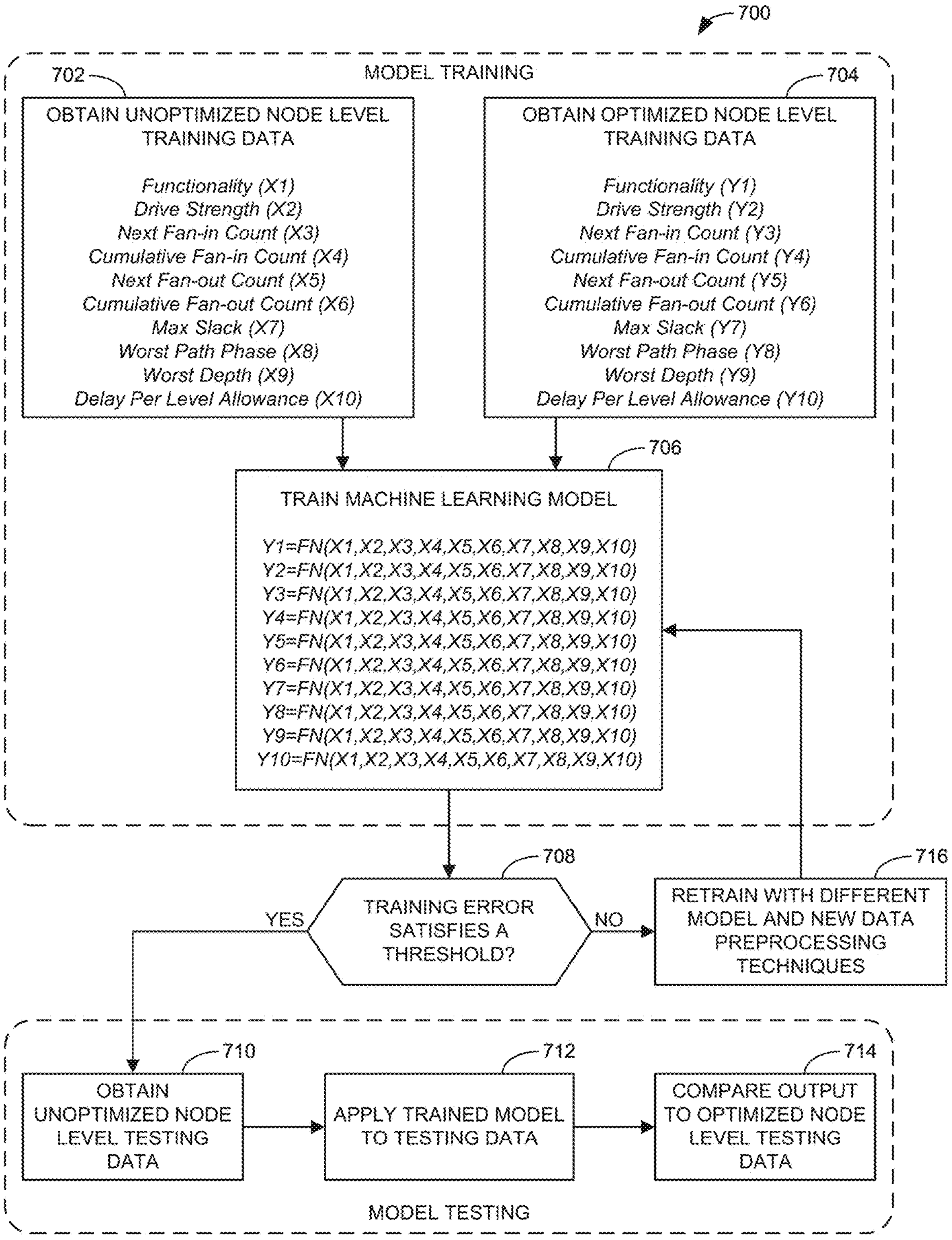
Figure 10:
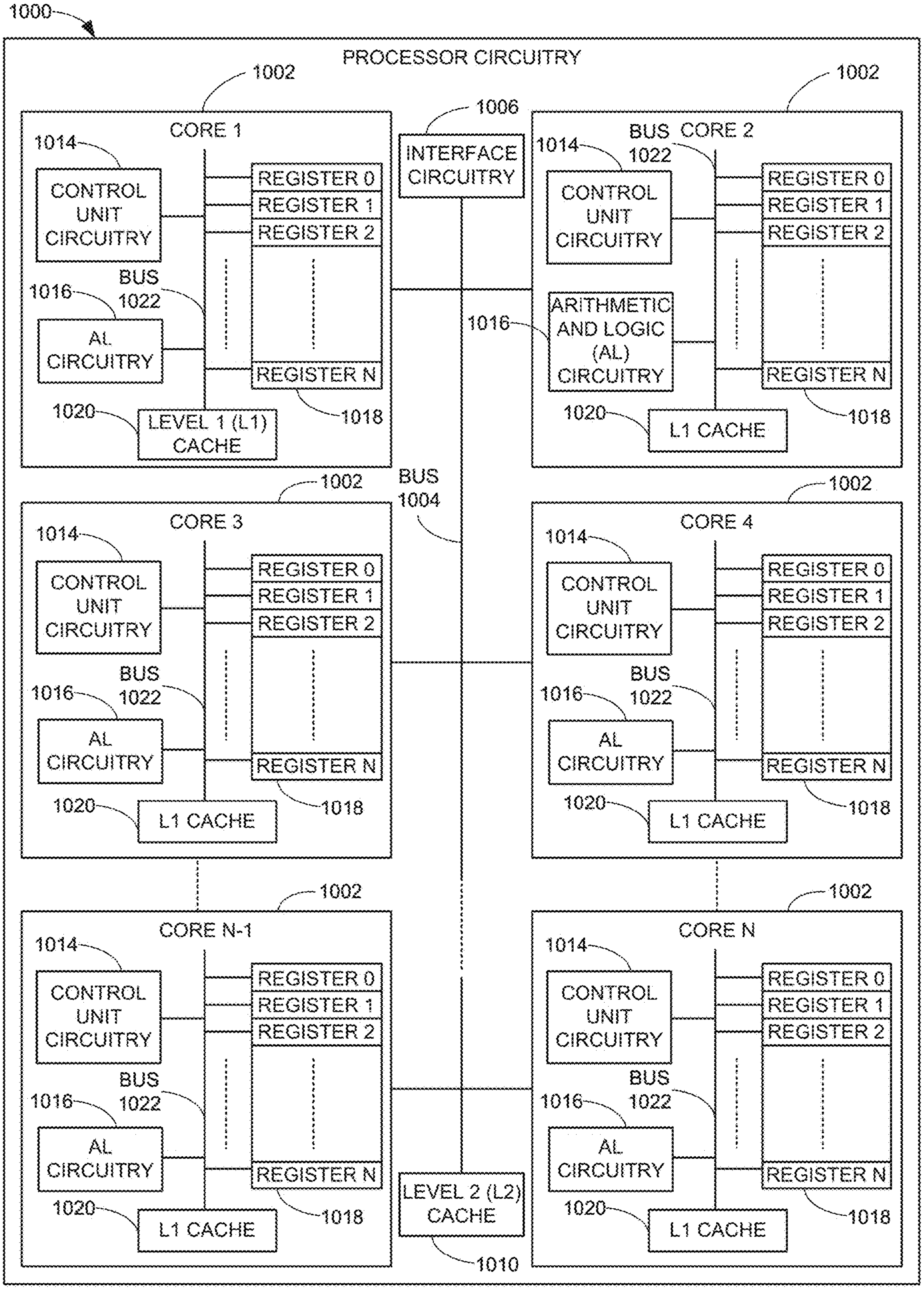
FIG. 10 is a block diagram of an example implementation of the programmable circuitry of FIG. 9.

FIG. 7 is a flowchart representative of example machine readable instructions and/or example operations 700 that may be executed and/or instantiated by processor circuitry to generate a particular machine learning model to predict the output of an EDA tool associated with particular node-level features. That is, FIG. 7 illustrates a specific example implementation of the flowchart of FIG. 4. The machine readable instructions and/or the operations 700 of FIG. 7 begin at block 702, at which the example communications circuitry 306 and/or the training data processing circuitry 308 obtains unoptimized node level training data. At block 704, the example communications circuitry 306 and/or the training data processing circuitry 308 obtains optimized node level training data. In this example, as shown in FIG. 10, the unoptimized and optimized training data is focused on ten specific node-level features including functionality, drive strength, next fan-in count, cumulative fan-in count, next fan-out count, cumulative fan-out count, max slack, worst path phase, worst depth, and delay per level allowance. In some examples, less than all of these may be identified as the features of interest for the machine learning model. In other examples, additional features may be identified. Additionally or alternatively, in some examples, some or all of the features of interest represented in the figure may be replaced by different features of interest. As indicated in FIG. 7, the identification and acquisition of the training data and the training of the machine learning model correspond to a model training process.

At block 706, the example model generation circuitry 314 takes the training data and trains a machine learning model. As shown in this example, each feature of interest to be predicted (e.g., Y1 through Y10) is predicted based on a different machine learning algorithm that uses each of the unoptimized features of interest as an input. At block 708, the example model generation circuitry 314 determines whether a training error for the machine learning model satisfies (e.g., is less than) a threshold. In some examples, the threshold can be set to any suitable value (e.g., 1%, 2%, 3%, 5%, 8%, 10%, etc.). In some examples, training may additionally or alternatively end based on other triggers events such as, for example, number of iterations, time elapsed, etc.

If the training error satisfies the threshold, control advances to block 710 where the example communications circuitry 306 and/or the training data processing circuitry 308 obtains unoptimized node level testing data. In some examples, the unoptimized node level testing data is similar to the unoptimized node level training data except that it is designated for testing or verification. At block 712, the example model generation circuitry 314 and/or the example model application circuitry 316 applies the trained model to the testing data. At block 714, the example model generation circuitry 314 and/or the example model application circuitry 316 compares the output to optimized node level testing data. As indicated in FIG. 7, the identification and acquisition of the testing data, the application of the trained model to the testing data, and the comparison of the output of the model to optimized testing data corresponds to a model testing process. Thereafter, the example flowchart of FIG. 7 ends.

Returning to block 708, if the training error does not satisfy the threshold, control advances to block 716. At block 716, the example model generation circuitry retrains with a different (e.g., better) model and new data preprocessing techniques. That is, if a particular model and/or a particular set of features of interest is shown to not be a reliable basis to predict the output of an EDA tool, a different model may be developed based on a different set of features of interest. Once the new model and the associated feature set is identified, the training process repeats as set forth above.

Figure 8:
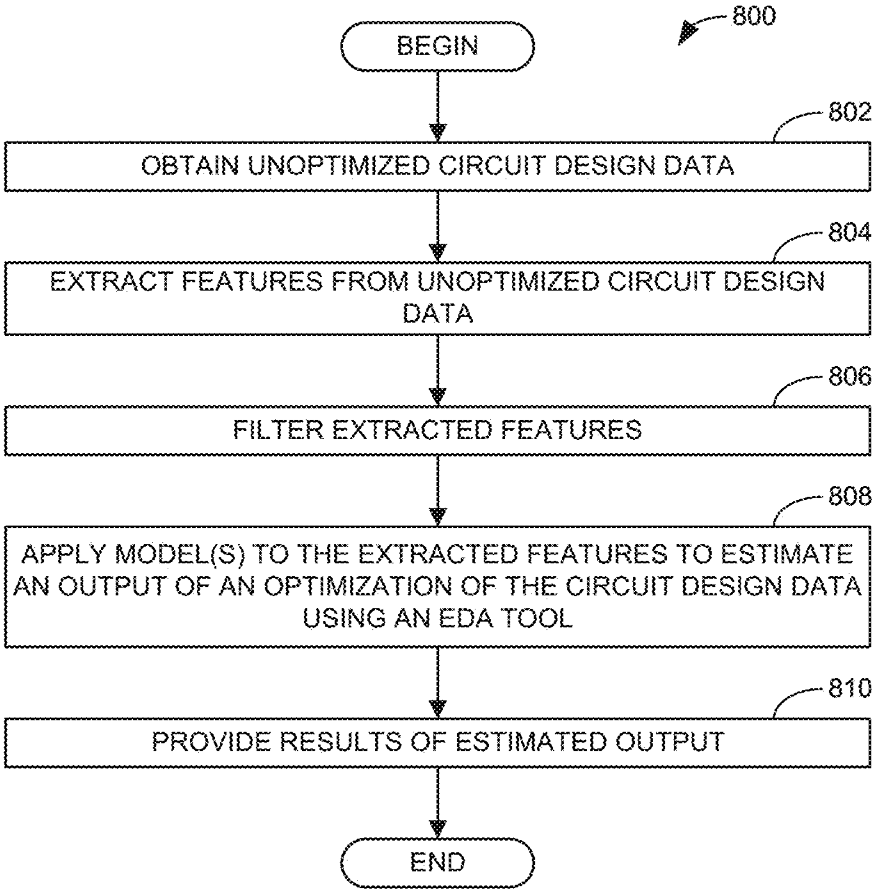

FIG. 8 is a flowchart representative of example machine readable instructions and/or example operations 800 that may be executed and/or instantiated by processor circuitry to apply a machine learning model to input data to predict the output of an EDA tool optimizing the input data prior to (without having to) execute the EDA tool. That is, the example flowchart of FIG. 8 enables the application of a model generated using the flowcharts of FIGS. 4-7. The machine readable instructions and/or the operations 800 of FIG. 8 begin at block 802, at which the example communications circuitry 306 and/or the training data processing circuitry 308 obtains unoptimized circuit design data. At block 804, the example feature extraction circuitry 310 extracts features from the unoptimized circuit design data. At block 806, the example data filtering circuitry 312 filters the extracted features. At block 808, the example model application circuitry 316 applies model(s) to the extracted features to estimate an output of an optimization of the circuit design data using an EDA tool. At block 810, the example results circuitry 318 provides results of the estimated output. Thereafter, the example flowchart of FIG. 8 ends.

Figure 9:
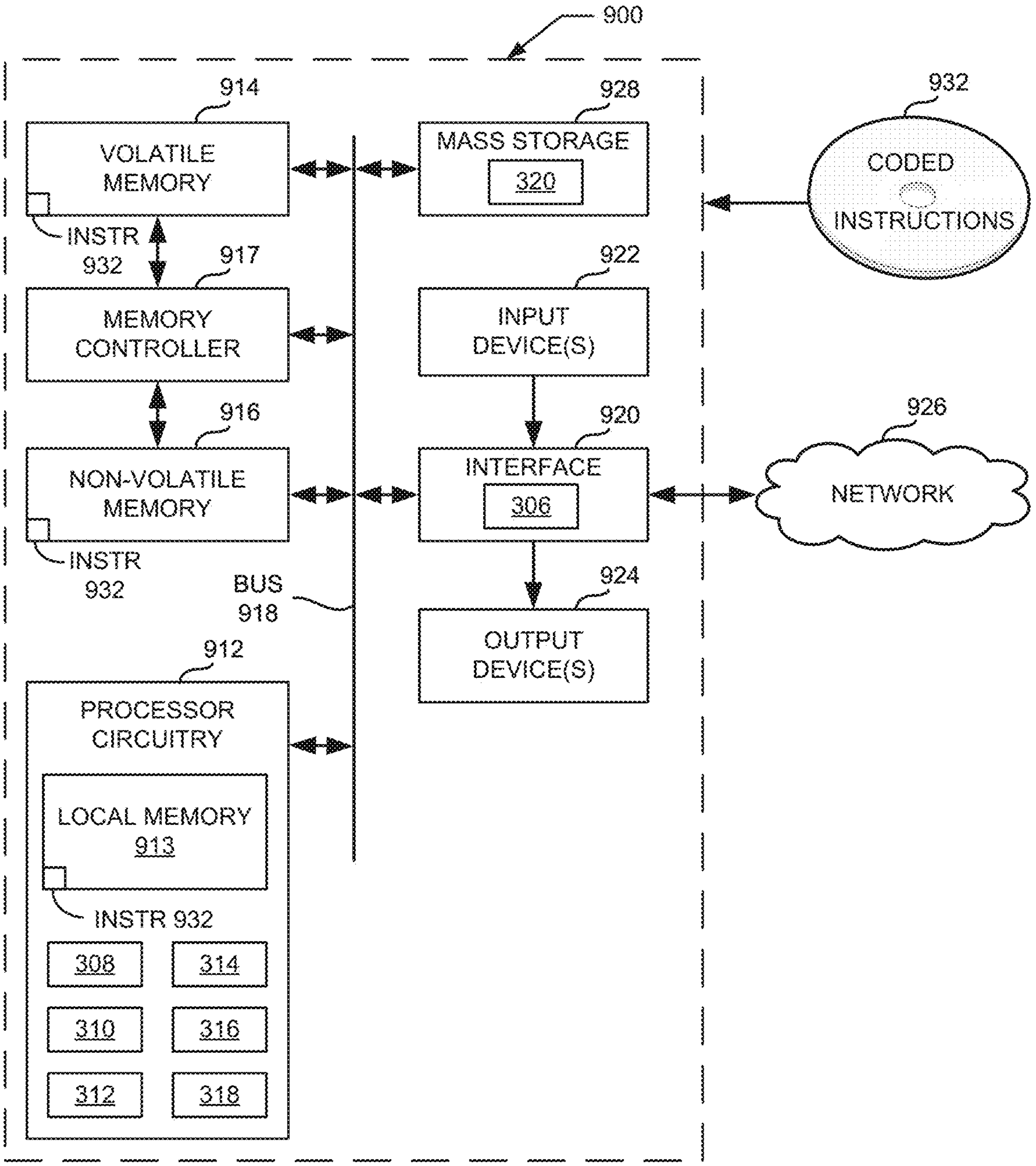
FIG. 9 is a block diagram of an example processing platform including programmable circuitry structured to execute, instantiate, and/or perform the example machine readable instructions and/or perform the example operations of FIGS. 4-8 to implement the example EDA tool modeling circuitry of FIG. 3.

FIG. 9 is a block diagram of an example programmable circuitry platform 900 structured to execute and/or instantiate the machine readable instructions and/or the operations of FIGS. 4-8 to implement the EDA tool modeling circuitry 304 of FIG. 3. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the example training data processing circuitry 308, the example feature extraction circuitry 310, the example data filtering circuitry 312, the example model generation circuitry 314, the example model application circuitry 316, and the example results circuitry 318.

The programmable circuitry 912 of the illustrated example includes a local memory 913 (e.g., a cache, registers, etc.). The programmable circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The programmable circuitry platform 900 of the illustrated example also includes one or more mass storage devices 928 to store software and/or data. Examples of such mass storage devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 932, which may be implemented by the machine readable instructions of FIGS. 4-8, may be stored in the mass storage device 928, in the volatile memory 914, in the non-volatile memory 916, and/or on at least one non-transitory computer readable storage medium such as a CD or DVD which may be removable.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowchart of FIG. 4-8 to effectively instantiate the circuitry of FIG. 3 as logic circuits to perform the operations corresponding to those machine readable instructions. In some such examples, the circuitry of FIG. 3 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIGS. 4-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the programmable circuitry, in the same chip package as the programmable circuitry and/or in one or more separate packages from the programmable circuitry.

Figure 11:
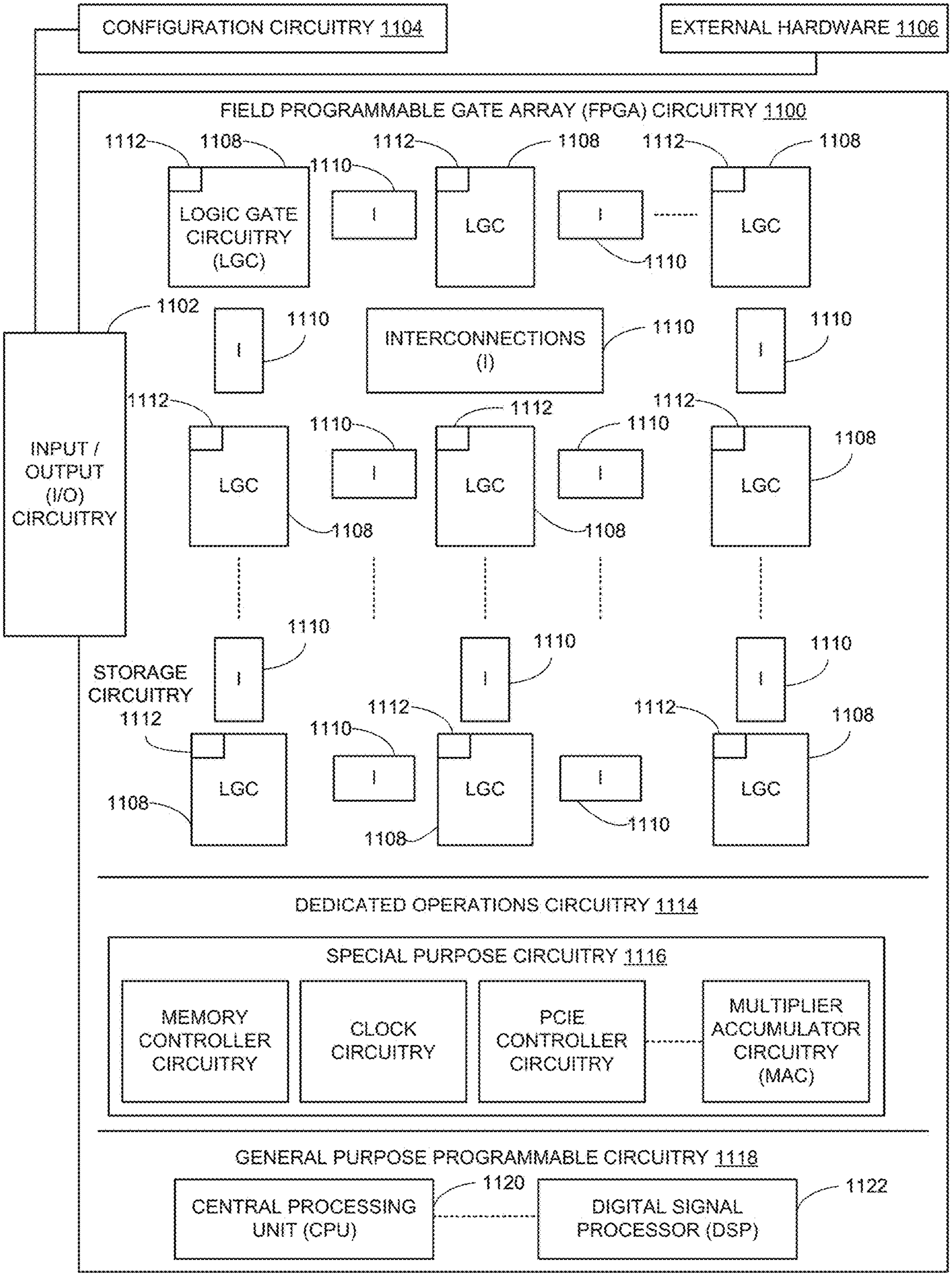
FIG. 11 is a block diagram of another example implementation of the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the operations and/or functions corresponding to the machine readable instructions in hardware and, thus, can often execute the operations/functions faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 4-8 but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine readable instructions represented by the flowcharts of FIGS. 4-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 4-8. As such, the FPGA circuitry 1100 may be configured and/or structured to effectively instantiate some or all of the operations/functions corresponding to the machine readable instructions of the flowcharts of FIGS. 4-8 as dedicated logic circuits to perform the operations/functions corresponding to those software instructions in a dedicated manner analogous to an ASIC. Therefore, the FPGA circuitry 1100 may perform the operations/functions corresponding to the some or all of the machine readable instructions of FIGS. 4-8 faster than the general purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine readable instructions, to configure the FPGA circuitry 1100, or portion(s) thereof. In some such examples, the configuration circuitry 1104 may obtain the binary file from a user, a machine (e.g., hardware circuitry (e.g., programmable or dedicated circuitry) that may implement an Artificial Intelligence/Machine Learning (AI/ML) model to generate the binary file, etc., and/or combination(s) thereof) In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 4-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the programmable circuitry 912 of FIG. 9, many other approaches are contemplated. For example, FPGA circuitry may include an on-board CPU, such as one or more of the example CPU 1120 of FIG. 11. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 902 of FIG. 9 may execute a first portion of the machine readable instructions represented by the flowcharts of FIGS. 4-8 to perform first operation(s)/function(s), the FPGA circuitry 1100 of FIG. 11 may be configured and/or structured to perform second operation(s)/function(s) corresponding to a second portion of the machine readable instructions represented by the flowcharts of FIGS. 4-8, and/or an ASIC may be configured and/or structured to perform third operation(s)/function(s) corresponding to a third portion of the machine readable instructions represented by the flowcharts of FIGS. 4-8.

It should be understood that some or all of the circuitry of FIG. 3 may, thus, be instantiated at the same or different times. For example, same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the circuitry of FIG. 3 may be instantiated, for example, in one or more threads executing concurrently and/or in series. For example, the microprocessor 1000 of FIG. 10 may execute machine readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the circuitry of FIG. 3 may be implemented within one or more virtual machines and/or containers executing on the microprocessor 1000 of FIG. 10.

In some examples, the programmable circuitry 1012 of FIG. 10 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG. 11) in another package, a GPU in yet another package, and an FPGA (e.g., the FPGA circuitry 1100 of FIG. 11) in still yet another package.

Figure 12:
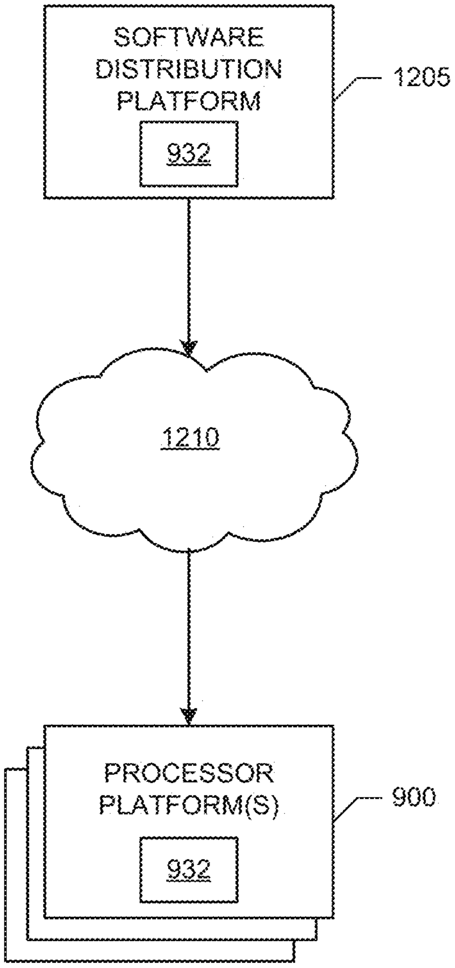
FIG. 12 is a block diagram of an example software/firmware/instructions distribution platform (e.g., one or more servers) to distribute software, instructions, and/or firmware (e.g., corresponding to the example machine readable instructions of FIGS. 4-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to other hardware devices (e.g., hardware devices owned and/or operated by third parties from the owner and/or operator of the software distribution platform) is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions of FIGS. 4-8, as described above. The one or more servers of the example software distribution platform 1205 are in communication with an example network 1210, which may correspond to any one or more of the Internet and/or any of the example networks 926 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 400, 500, 600, 700, 800 of FIGS. 4-8, may be downloaded to the example programmable circuitry platform 400, which is to execute the machine readable instructions 932 to implement the EDA tool modeling circuitry 304. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices. Although referred to as software above, the distributed "software" could alternatively be firmware.

From the foregoing, it will be appreciated that example systems, methods, apparatus, and articles of manufacture have been disclosed that predict outputs of an EDA tool using machine learning. Due to the complexity of modern integrated circuits (e.g., SOCs) EDA tools can take hours to days to run through a single iteration of a single stage of the physical structure design circuit process. Examples disclosed herein enable the prediction of outputs of the EDA without these significant delays to determine whether the full optimization process using an EDA tool is needed and avoid the execution of EDA tools when the prediction indicates it would not be beneficial. Thus, examples disclosed herein can drastically shorten the design process and free up computer systems that would otherwise be used to execute the EDA tool. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus comprising an interface, machine readable instructions, and programmable circuitry to at least one of instantiate or execute the machine readable instructions to access circuit design data to be optimized by an electronic design automation (EDA) tool as part of a circuit design process for an integrated circuit, extract features from the circuit design data, apply a machine learning model to the features to estimate an output of the EDA tool, the estimated output determined without execution of the EDA tool, and provide results of the estimated output.

Example 2 includes the apparatus of example 1, wherein the circuit design data is an input for a portion of a construction phase of the circuit design process.

Example 3 includes the apparatus of example 2, wherein the portion of the construction phase includes at least one of a logic synthesis stage or a physical synthesis stage.

Example 4 includes the apparatus of example 2, wherein the portion of the construction phase includes at least one of a placement stage, a clock tree synthesis stage, or a routing stage.

Example 5 includes the apparatus of example 1, wherein the circuit design data is an input for a portion of a sign-off phase of the circuit design process.

Example 6 includes the apparatus of example 1, wherein the circuit design data includes a gate-level description of the integrated circuit, the gate-level description to specify cells in the integrated circuit and timing paths associated with the cells.

Example 7 includes the apparatus of example 6, wherein the features correspond to at least one of a functionality, a drive strength, fan-in count, a fan-out count, a slack, a path phase, a path depth, or a delay per level allowance associated with outputs of ones of the cells.

Example 8 includes the apparatus of example 6, wherein the features correspond to at least one of a sequence of cells in ones of the timing paths, an identifier, a slack, a start clock, an end clock, an available phase, a dominant exception, or a count of different types of the cells associated with ones of the timing paths.

Example 9 includes the apparatus of example 6, wherein the results include an estimate of a path depth for ones of the timing paths.

Example 10 includes the apparatus of example 6, wherein the results include an estimate of a sequence of the cells in ones of the timing paths.

Example 11 includes the apparatus of example 1, wherein the programmable circuitry is to generate the machine learning model.

Example 12 includes the apparatus of example 1, wherein the programmable circuitry is to generate the machine learning model based on supervised training of the machine learning model using unoptimized training data and optimized training data, the unoptimized training data not having been processed through the EDA tool to converge at a solution that meets design specifications and quality checks for the integrated circuit, the optimized training data having been processed through the EDA tool to converge at the solution that meets the design specifications and quality checks for the integrated circuit.

Example 13 includes the apparatus of example 12, wherein the programmable circuitry is to extract sequences of cells in timing paths defined for the integrated circuit, classify the sequences of the cells using an unsupervised machine learning algorithm, and filter the sequences of the cells based on the classification, the unoptimized training data based on the filtered sequences.

Example 14 includes the apparatus of example 13, wherein the classification of the sequences is based on patterns in the sequences of the cells that are common between optimized timing paths and unoptimized timing paths.

Example 15 includes a non-transitory machine readable storage medium comprising instructions that, when executed, cause programmable circuitry to at least access circuit design data to be optimized by an electronic design automation (EDA) tool as part of a circuit design process for an integrated circuit, extract features from the circuit design data, apply a machine learning model to the features to estimate an output of the EDA tool, the estimated output determined without execution of the EDA tool, and provide results of the estimated output.

Example 16 includes the machine readable storage medium of example 15, wherein the circuit design data is an input for a portion of a construction phase of the circuit design process.

Example 17 includes the machine readable storage medium of example 16, wherein the portion of the construction phase includes at least one of a logic synthesis stage or a physical synthesis stage.

Example 18 includes the machine readable storage medium of example 16, wherein the portion of the construction phase includes at least one of a placement stage, a clock tree synthesis stage, or a routing stage.

Example 19 includes the machine readable storage medium of example 15, wherein the circuit design data is an input for a portion of a sign-off phase of the circuit design process.

Example 20 includes the machine readable storage medium of example 15, wherein the circuit design data includes a gate-level description of the integrated circuit, the gate-level description to specify cells in the integrated circuit and timing paths associated with the cells.

Example 21 includes the machine readable storage medium of example 20, wherein the features correspond to at least one of a functionality, a drive strength, fan-in count, a fan-out count, a slack, a path phase, a path depth, or a delay per level allowance associated with outputs of ones of the cells.

Example 22 includes the machine readable storage medium of example 20, wherein the features correspond to at least one of a sequence of cells in ones of the timing paths, an identifier, a slack, a start clock, an end clock, an available phase, a dominant exception, or a count of different types of the cells associated with ones of the timing paths.

Example 23 includes the machine readable storage medium of example 20, wherein the results include an estimate of a path depth for ones of the timing paths.

Example 24 includes the machine readable storage medium of example 20, wherein the results include an estimate of a sequence of the cells in ones of the timing paths.

Example 25 includes the machine readable storage medium of example 15, wherein the instructions cause the programmable circuitry to generate the machine learning model.

Example 26 includes the machine readable storage medium of example 15, wherein the instructions cause the programmable circuitry to generate the machine learning model based on supervised training of the machine learning model using unoptimized training data and optimized training data, the unoptimized training data not having been processed through the EDA tool to converge at a solution that meets design specifications and quality checks for the integrated circuit, the optimized training data having been processed through the EDA tool to converge at the solution that meets the design specifications and quality checks for the integrated circuit.

Example 27 includes the machine readable storage medium of example 26, wherein the instructions cause the programmable circuitry to extract sequences of cells in timing paths defined for the integrated circuit, classify the sequences of the cells using an unsupervised machine learning algorithm, and filter the sequences of the cells based on the classification, the unoptimized training data based on the filtered sequences.

Example 28 includes the machine readable storage medium of example 27, wherein the classification of the sequences is based on patterns in the sequences of the cells that are common between optimized timing paths and unoptimized timing paths.

Example 29 includes a non-transitory machine readable medium comprising communications circuitry to cause at least one machine to access circuit design data to be optimized by an electronic design automation (EDA) tool as part of a circuit design process for an integrated circuit, feature extraction circuitry to cause the at least one machine to extract features from the circuit design data, model application circuitry to cause the at least one machine to apply a machine learning model to the features to estimate an output of the EDA tool, the estimated output determined without execution of the EDA tool, and results circuitry to cause the at least one machine to provide results of the estimated output.

Example 30 includes the machine readable medium of example 29, wherein the circuit design data is an input for a portion of a construction phase of the circuit design process.

Example 31 includes the machine readable medium of example 30, wherein the portion of the construction phase includes at least one of a logic synthesis stage or a physical synthesis stage.

Example 32 includes the machine readable medium of example 30, wherein the portion of the construction phase includes at least one of a placement stage, a clock tree synthesis stage, or a routing stage.

Example 33 includes the machine readable medium of example 29, wherein the circuit design data is an input for a portion of a sign-off phase of the circuit design process.

Example 34 includes the machine readable medium of example 29, wherein the circuit design data includes a gate-level description of the integrated circuit, the gate-level description to specify cells in the integrated circuit and timing paths associated with the cells.

Example 35 includes the machine readable medium of example 34, wherein the features correspond to at least one of a functionality, a drive strength, fan-in count, a fan-out count, a slack, a path phase, a path depth, or a delay per level allowance associated with outputs of ones of the cells.

Example 36 includes the machine readable medium of example 34, wherein the features correspond to at least one of a sequence of cells in ones of the timing paths, an identifier, a slack, a start clock, an end clock, an available phase, a dominant exception, or a count of different types of the cells associated with ones of the timing paths.

Example 37 includes the machine readable medium of example 34, wherein the results include an estimate of a path depth for ones of the timing paths.

Example 38 includes the machine readable medium of example 34, wherein the results include an estimate of a sequence of the cells in ones of the timing paths.

Example 39 includes the machine readable medium of example 29, further including model generation circuitry to cause the at least one machine to generate the machine learning model.

Example 40 includes the machine readable medium of example 29, further including model generation circuitry to cause the at least one machine to generate the machine learning model based on supervised training of the machine learning model using unoptimized training data and optimized training data, the unoptimized training data not having been processed through the EDA tool to converge at a solution that meets design specifications and quality checks for the integrated circuit, the optimized training data having been processed through the EDA tool to converge at the solution that meets the design specifications and quality checks for the integrated circuit.

Example 41 includes the machine readable medium of example 40, wherein the feature extraction circuitry is to cause the at least one machine to extract sequences of cells in timing paths defined for the integrated circuit, the machine readable medium further including training data processing circuitry to cause the at least one machine to classify the sequences of the cells using an unsupervised machine learning algorithm, and data filtering circuitry to cause the at least one machine to filter the sequences of the cells based on the classification, the unoptimized training data based on the filtered sequences.

Example 42 includes the machine readable medium of example 41, wherein the classification of the sequences is based on patterns in the sequences of the cells that are common between optimized timing paths and unoptimized timing paths.

Example 43 includes a method comprising accessing circuit design data to be optimized by an electronic design automation (EDA) tool as part of a circuit design process for an integrated circuit, extracting features from the circuit design data, applying, by executing instructions via programmable circuitry, a machine learning model to the features to estimate an output of the EDA tool, the estimated output determined without execution of the EDA tool, and providing results of the estimated output.

Example 44 includes the method of example 43, wherein the circuit design data is an input for a portion of a construction phase of the circuit design process.

Example 45 includes the method of example 44, wherein the portion of the construction phase includes at least one of a logic synthesis stage or a physical synthesis stage.

Example 46 includes the method of example 44, wherein the portion of the construction phase includes at least one of a placement stage, a clock tree synthesis stage, or a routing stage.

Example 47 includes the method of example 43, wherein the circuit design data is an input for a portion of a sign-off phase of the circuit design process.

Example 48 includes the method of example 43, wherein the circuit design data includes a gate-level description of the integrated circuit, the gate-level description to specify cells in the integrated circuit and timing paths associated with the cells.

Example 49 includes the method of example 48, wherein the features correspond to at least one of a functionality, a drive strength, fan-in count, a fan-out count, a slack, a path phase, a path depth, or a delay per level allowance associated with outputs of ones of the cells.

Example 50 includes the method of example 48, wherein the features correspond to at least one of a sequence of cells in ones of the timing paths, an identifier, a slack, a start clock, an end clock, an available phase, a dominant exception, or a count of different types of the cells associated with ones of the timing paths.

Example 51 includes the method of example 48, wherein the results include an estimate of a path depth for ones of the timing paths.

Example 52 includes the method of example 48, wherein the results include an estimate of a sequence of the cells in ones of the timing paths.

Example 53 includes the method of example 43, further including generating the machine learning model.

Example 54 includes the method of example 43, further including generating the machine learning model based on supervised training of the machine learning model using unoptimized training data and optimized training data, the unoptimized training data not having been processed through the EDA tool to converge at a solution that meets design specifications and quality checks for the integrated circuit, the optimized training data having been processed through the EDA tool to converge at the solution that meets the design specifications and quality checks for the integrated circuit.

Example 55 includes the method of example 54, further including extracting sequences of cells in timing paths defined for the integrated circuit, classifying the sequences of the cells using an unsupervised machine learning algorithm, and filtering the sequences of the cells based on the classification, the unoptimized training data based on the filtered sequences.

Example 56 includes the method of example 55, wherein the classifying of the sequences is based on patterns in the sequences of the cells that are common between optimized timing paths and unoptimized timing paths.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

an interface;

machine readable instructions; and at least one programmable circuit to at least one of instantiate or execute the machine readable instructions to:

access circuit design data to be processed by an electronic design automation (EDA) tool as part of a circuit design process for an integrated circuit, the circuit design data including a netlist description of the integrated circuit;

extract features from the netlist description;

input the extracted features to a machine learning model to estimate an output of the EDA tool, the machine learning model is to determine the estimated output operating on an analysis of the netlist description; and provide results of the estimated output to facilitate determination of whether to execute the EDA tool based on current design parameters for the integrated circuit or to modify the design parameters before executing the EDA tool.

2. The apparatus of claim 1, wherein the circuit design data is an input for a portion of a construction phase of the circuit design process.

3. The apparatus of claim 2, wherein the portion of the construction phase includes at least one of a logic synthesis stage or a physical synthesis stage.

4. The apparatus of claim 2, wherein the portion of the construction phase includes at least one of a placement stage, a clock tree synthesis stage, or a routing stage.

5. The apparatus of claim 1, wherein the circuit design data is an input for a portion of a sign-off phase of the circuit design process.

6. The apparatus of claim 1, wherein the netlist description includes a gate-level description of the integrated circuit, the gate-level description to specify cells in the integrated circuit and timing paths associated with the cells.

7. The apparatus of claim 6, wherein the features correspond to at least one of a functionality, a drive strength, fan-in count, a fan-out count, a slack, a path phase, a path depth, or a delay per level allowance associated with outputs of ones of the cells.

8. The apparatus of claim 6, wherein the features correspond to at least one of a sequence of cells in ones of the timing paths, an identifier, a slack, a start clock, an end clock, an available phase, a dominant exception, or a count of different types of the cells associated with ones of the timing paths.

9. The apparatus of claim 6, wherein the results include an estimate of a path depth for ones of the timing paths.

10. The apparatus of claim 6, wherein the results include an estimate of a sequence of the cells in ones of the timing paths.

11. The apparatus of claim 1, wherein one or more of the at least one programmable circuit is to train the machine learning model.

12. The apparatus of claim 1, wherein one or more of the at least one programmable circuit is to train the machine learning model based on supervised training of the machine learning model using unoptimized training data and optimized training data, the unoptimized training data not having been processed through the EDA tool to converge at a solution that meets design specifications and quality checks for the integrated circuit, the optimized training data having been processed through the EDA tool to converge at the solution that meets the design specifications and quality checks for the integrated circuit.

13. An apparatus comprising:
- an interface;
- machine readable instructions; and
- at least one programmable circuit to at least one of instantiate or execute the machine readable instructions to:
  - train a machine learning model based on supervised training of the machine learning model using unoptimized training data and optimized training data, the unoptimized training data not having been processed through an electronic design automation (EDA) tool to converge at a solution that meets design specifications and quality checks as part of a circuit design process for an integrated circuit, the optimized training data having been processed through the EDA tool to converge at the solution that meets the design specifications and quality checks for the integrated circuit, training of the machine learning model including:
    - extracting sequences of cells in timing paths defined for the integrated circuit;
    - classifying the sequences of the cells using an unsupervised machine learning algorithm; and
    - filtering the sequences of the cells based on the classification, the unoptimized training data based on the filtered sequences;
  - access circuit design data to be optimized by the EDA tool;
  - extract features from the circuit design data;
  - apply the machine learning model to the features to estimate an output of the EDA tool, the estimated output determined without execution of the EDA tool; and
  - provide results of the estimated output.

14. The apparatus of claim 13, wherein the classification of the sequences is based on patterns in the sequences of the cells that are common between optimized timing paths and unoptimized timing paths.

15. A non-transitory machine readable storage medium comprising instructions that cause at least one programmable circuit to at least:
- access circuit design data to be processed by an electronic design automation (EDA) tool as part of a circuit design process for an integrated circuit, the circuit design data including at least one of a netlist description of the integrated circuit or a layout description of the integrated circuit;
- extract features from the at least one of the netlist description or the layout description;
- input the extracted features to a machine learning model to estimate an output of the EDA tool, the machine learning model is to determine the estimated output without operating on an analysis of at least one of the netlist description or the layout description; and
- provide results of the estimated output to facilitate determination of whether to execute the EDA tool based on current design parameters for the integrated circuit or to modify the design parameters before executing the EDA tool.

16. The machine readable storage medium of claim 15, wherein the circuit design data is an input for a portion of a construction phase of the circuit design process.

17. The machine readable storage medium of claim 15, wherein the circuit design data is an input for a portion of a sign-off phase of the circuit design process.

18. The machine readable storage medium of claim 15, wherein the circuit design data includes the netlist description, and the netlist description includes a gate-level description of the integrated circuit, the gate-level description to specify cells in the integrated circuit and timing paths associated with the cells.

19. A non-transitory machine readable medium comprising:
- communications circuitry to cause at least one machine to access circuit design data to be processed by an electronic design automation (EDA) tool as part of a circuit design process for an integrated circuit, the circuit design data including a layout description of the integrated circuit;
- feature extraction circuitry to cause the at least one machine to extract features from the layout description;
- model application circuitry to cause the at least one machine to apply a machine learning model to the features to estimate an output of the EDA tool, the features to be provided as an input to the machine learning model, the machine learning model to determine the estimated output without operating on an analysis of the layout description; and
- results circuitry to cause the at least one machine to provide results of the estimated output to facilitate determination of whether to execute the EDA tool based on current design parameters for the integrated circuit or to modify the design parameters before executing the EDA tool.

20. The machine readable medium of claim 19, wherein the circuit design data includes a gate-level description of the integrated circuit, the gate-level description to specify cells in the integrated circuit and timing paths associated with the cells.

* * * * *